(12) United States Patent
Sato et al.

(10) Patent No.: US 9,325,509 B2
(45) Date of Patent: Apr. 26, 2016

(54) DETERMINATION METHOD FOR CRYPTOGRAPHIC ALGORITHM USED FOR SIGNATURE, VALIDATION SERVER AND PROGRAM

(75) Inventors: Chinatsu Sato, Tokyo (JP); Akane Suzuki, Tokyo (JP); Takahiro Fujishiro, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/119,401

(22) PCT Filed: Jul. 10, 2012

(86) PCT No.: PCT/JP2012/067607
§ 371 (c)(1),
(2), (4) Date: Nov. 21, 2013

(87) PCT Pub. No.: WO2013/011874
PCT Pub. Date: Jan. 24, 2013

(65) Prior Publication Data
US 2014/0149740 A1    May 29, 2014

(30) Foreign Application Priority Data
Jul. 15, 2011    (JP) .................... 2011-156257

(51) Int. Cl.
*H04L 29/06*    (2006.01)
*H04L 9/32*    (2006.01)
(Continued)

(52) U.S. Cl.
CPC ............ *H04L 9/3268* (2013.01); *G06F 21/335* (2013.01); *H04L 9/006* (2013.01)

(58) Field of Classification Search
CPC ....... H04L 9/066; H04L 9/3268; G06F 21/33; G06F 21/335
USPC ............ 713/156, 158, 168, 175–176; 726/10; 380/277, 285
See application file for complete search history.

(56) References Cited

U.S. PATENT DOCUMENTS 6,463,534 B1 * 10/2002 Geiger et al. ................. 713/168
8,347,082 B2 *  1/2013 Sato et al. .................... 713/158
(Continued)

FOREIGN PATENT DOCUMENTS

EP    1 780 938 A2    5/2007
EP    2 187 590 A1    5/2010
(Continued)

OTHER PUBLICATIONS

D. Cooper, NIST, Internet-Draft , "X.509 Internet Public Key Infrastructure Online Certificate Status Protocol—OCSP" draft-ietf-pkix-rfc2560bis-03, Apr. 4, 2011.*
(Continued)

*Primary Examiner* — Samson Lemma
(74) *Attorney, Agent, or Firm* — Volpe and Koenig, P.C.

(57) ABSTRACT

On the basis of revocation information of a certificate, information of a certification authority and of the certificate issued by the certification authority from a terminal device, and information of a cryptographic algorithm, validity of the certificate from the terminal device is determined. If the certificate is valid, a validation result treating the certificate as valid is created, and using information of the cryptographic algorithm from the terminal device and information of the cryptographic algorithm used for the signature of the certification authority which has been imparted to the revocation information of the certificate, a selection list of cryptographic algorithms used for the response signature to impart to the verification result of the certificate is created to determine the cryptographic algorithm used for the response signature to impart the verification result of the certificate on the basis of the created list and the cryptographic algorithms capable of being accommodated by the verification server.

14 Claims, 17 Drawing Sheets

(51) Int. Cl.
*H04L 9/00* (2006.01)
*G06F 21/33* (2013.01)

(56) References Cited

U.S. PATENT DOCUMENTS

| | | | |
|---|---|---|---|
| 8,560,851 B1* | 10/2013 | Cherukumudi et al. ...... | 713/169 |
| 2004/0111609 A1 | 6/2004 | Kaji et al. | |
| 2004/0128502 A1* | 7/2004 | Royer ........................ | 713/156 |
| 2004/0168061 A1* | 8/2004 | Kostal et al. ................ | 713/170 |
| 2005/0246533 A1* | 11/2005 | Gentry ................ | H04L 9/0836 |
| | | | 713/170 |
| 2008/0301439 A1* | 12/2008 | Hashimoto et al. .......... | 713/156 |
| 2009/0300349 A1* | 12/2009 | Hashimoto et al. .......... | 713/156 |
| 2010/0122081 A1 | 5/2010 | Sato et al. | |
| 2011/0004763 A1* | 1/2011 | Sato et al. .................... | 713/175 |
| 2013/0061043 A1 | 3/2013 | Sato et al. | |

FOREIGN PATENT DOCUMENTS

| | | |
|---|---|---|
| JP | 2008-301417 A | 12/2008 |
| JP | 2010-118858 A | 5/2010 |
| JP | 2011-015110 A | 1/2011 |

OTHER PUBLICATIONS

Myers et al., "X. 509 Internet Public Key Infrastructure Online Certificate Status Protocol-OCSP", Network Working Group., The Internet Society, Jun. 1999.

Santesson, S., "Online Certificate Status Protocol Algorithm Agility", Internet Engineering Task Force (IETF), Jun. 2011.

* cited by examiner

FIG. 6

CERTIFICATION AUTHORITY IDENTIFICATION TABLE 60

| AUTHORITY CERTIFICATE | CA1_new CERTIFICATE | CA1_old CERTIFICATE | CA2_new CERTIFICATE | CA2_old CERTIFICATE | CA3 CERTIFICATE |
|---|---|---|---|---|---|
| HASH VALUE (SHA-1) [AUTHORITY CERTIFICATE ID] | 12345/ abcde | 12345/ aabce | 34567/ aaabc | 34567/ aaaab | 56789/ aaaaa |
| HASH VALUE (SHA-256) | 135791113/ acegikmoq | 135791113/ aacegikmo | 579111315/ aaacegikm | 579111315/ aaaacegik | 9111315171 aaaaacegi |
| HASH VALUE (SHA-512) | 13691215182 1/ bdfhjlnprtvx | 13691215182 1/ bbdfhjlnprtv | 6912151821 24/ bbbdfhjlnprt | 6912151821 24/ bbbbdfhjlnpr | 1215182124 27/ bbbbbdfhjlnp |
| HASH VALUE (ARBITRARY HASH ALGORITHM) | 121212/ ababab | 121212/ aababa | 14141/ aaabab | 14141/ aaaaba | 17171/ aaaaab |
| AUTHORITY ID | 12345 | 12345 | 34567 | 34567 | 56789 |

REVOCATION INFORMATION TABLE 80

| AUTHORITY ID 81 | OID OF SIGNATURE ALGORITHM 82 | VALIDITY PERIOD OF CRL (thisUpdate, nextUpdate) 83 | SERIAL NUMBER OF REVOKED CERTIFICATE 84 | REVOCATION DATE AND TIME OF CERTIFICATE 85 | REASON CODE FOR CERTIFICATE REVOCATION 86 | ALGORITHM USED TO SIGN CRL 87 |
|---|---|---|---|---|---|---|
| 12345 | 1.2.840.113549.1.1.11 | 2008/01/15/ 00:00:00, 2008/01/17/ 23:59:59 | 3 | 2010/09/12/ 18:03:00 | 1 | SHA1with RSAEncryption |
| | | | 5 | 2010/09/15/ 13:34:00 | 3 | |
| | | | 122 | 2010/10/03/ 09:24:00 | 3 | |
| | | | 123 | 2010/10/03/ 10:58:00 | 0 | |
| | | | 200 | 2011/01/10/07/ 24:00 | 1 | |
| 34567 | 1.2.840.113549.1.1.5 | 2008/01/15/ 10:00:00, 2008/01/17/ 09:59:59 | 1530 | 2010/12/24/ 08:15:40 | 4 | SHA256with RSAEncryption |
| | | | 1682 | 2011/01/09/ 09:45:24 | 0 | |
| 56789 | 1.2.840.10040.4.3 | 2008/01/15/ 00:00:00, 2008/01/19/ 23:59:59 | 231 | 2010/11/29/ 20:24:10 | 0 | SHA256with RSAEncryption |
| | | | 247 | 2010/12/29/ 13:24:20 | 1 | |
| | | | 290 | 2011/01/15/ 17:15:00 | 1 | |

FIG. 9

OCSP CERTIFICATE IDENTIFICATION TABLE 90

| AUTHORITY CERTIFICATE ID | 12345/ abcde [DEFAULT] | 12345/ aabce | 34567/ aaabc | 34567/ aaaab | 56789/ aaaaa |
|---|---|---|---|---|---|
| AUTHORITY CERTIFICATE FILE NAME | /tmp/CA1_new .cer | /tmp/CA1_old .cer | /tmp/CA2_new .cer | /tmp/CA2_old .cer | /tmp/CA3.cer |
| OCSP CERTIFICATE FILE NAME | /tmp/ser1_new .cer | /tmp/ser1_old .cer | /tmp/ser2_new .cer | /tmp/ser2_old .cer | /tmp/ser3_.cer |

REQUEST TABLE 100

| REQUEST IDENTIFIER | issuerNameHash/ issuerKeyHash | SERIAL NUMBER | PSA (Preferred Signature Algorithm) | ALGORITHM USED TO SIGN OCSP REQUEST |
|---|---|---|---|---|
| 101 | 102 | 103 | 104 | 105 |
| ... | 13571357/acefacef | 0023 | SHA1withRSAEncryption | SHA1withRSAEncryption |
| ... | 11223/12ab3 | 0045 | SHA256withRSAEncryption | |
| | | | ... | |
| | | | SHA1withRSAEncryption | SHA1withRSAEncryption |

FIG. 11

SIGNATURE POLICY TABLE 110

| S | RESPONSE SIGNATURE ALGORITHM |
|---|---|
| 1 | SHA1withRSAEncryption |
| 2 | SHA256withRSAEncryption |
| 3 | ... |

RESPONSE SIGNATURE ALGORITHM SELECTION LIST TABLE ~120

| T | ITEM | U | ENCRYPTION ALGORITHM |
|---|------|---|----------------------|
| 1 | Preferred Signature Algorithm | 1 | SHA256withRSAEncryption |
| | | ... | ... |
| | | 1 | SHA1withRSAEncryption |
| 2 | SIGNATURE ALGORITHM USED TO SIGN CRL | 1 | SHA256withRSAEncryption |
| 3 | SIGNATURE ALGORITHM USED TO SIGN OCSP REQUEST | 1 | SHA1withRSAEncryption |
| 4 | SIGNATURE ALGORITHM THAT OCSP RESPONDER SETS AS DEFAULT | 1 | SHA256withRSAEncryption |
| 5 | SIGNATURE ALGORITHM SPECIFIED FOR VERSION OF OCSP | 1 | SHA256withRSAEncryption |

OCSP CERTIFICATE IDENTIFICATION TABLE 90

| | | | | |
|---|---|---|---|---|
| AUTHORITY CERTIFICATE ID | 12345/ abcde [DEFAULT] | 12345/ aabce | 34567/ aaabc | 34567/ aaaab | 56789/ aaaaa |
| AUTHORITY CERTIFICATE FILE NAME | /tmp/CA1_new .cer | /tmp/CA1_old .cer | /tmp/CA2_new .cer | /tmp/CA2_old .cer | /tmp/CA3.cer |
| OCSP CERTIFICATE FILE NAME | /tmp/ser1_new .cer | /tmp/ser1_old .cer | /tmp/ser2_new .cer | /tmp/ser2_old .cer | /tmp/ser3_.cer |
| RESPONSE SIGNATURE ALGORITHM | SHA1with RSAEncryption SHA256with RSAEncryption | SHA256with RSAEncryption | SHA1with RSAEncryption SHA256with RSAEncryption | SHA256with RSAEncryption | SHA256with RSAEncryption SHA1with RSAEncryption |

91, 92, 93, 94

DETERMINATION METHOD FOR CRYPTOGRAPHIC ALGORITHM USED FOR SIGNATURE, VALIDATION SERVER AND PROGRAM

CROSS REFERENCE TO RELATED APPLICATIONS

The present application claims the benefit under Japanese Patent Application No. 2011-156257 filed Jul. 15, 2011 the disclosure of which is incorporated herein by reference.

TECHNICAL FIELD

The present invention relates to a validation server for validating validity of a public key certificate, and a determination method and a program for cryptographic algorithm used for signature in the validation server.

BACKGROUND ART

When electronic data such as an electronic document is transmitted in the public key foundation in a public key infrastructure, a digital signature of a transmitter and a public key certificate issued by a certification authority are attached to electronic data which becomes an object. A receiver confirms that the transmitted electronic data is not falsified and the electronic data is certainly electronic data transmitted from the transmitter himself or herself by confirming the validity of the digital signature (hereafter referred to as "signature") and the public key certificate attached to received data. Issuance of the public key certificate and confirmation of the validity are conducted in the public key infrastructure. And its standard specifications are stipulated in RFC 5280 (Internet X.509 Public Key Infrastructure Certificate and CRL Profile) and the like.

For example, in a case where there is a change in contents stated in a public key certificate before its term of validity expires, the public key certificate is revoked to become invalid by a certification authority that issued the public key certificate. In confirmation of validity of a received public key certificate, therefore, the receiver needs to certify whether the public key certificate is revoked.

For ascertaining whether the certificate is revoked, a public key certificate revocation list (hereafter referred to as "CRL") issued by the certification authority is used. In the CRL, a name (issuerName) of the certification authority, key information (authorityKeyIdentifier) of the certification authority, a serial number (serialNumber) of a revoked public key certificate included in public key certificates in the term of validity issued by the certification authority, the term of validity of the CRL, and the like are stated. A signature of the certification authority is affixed to the CRL. The CRL is issued periodically by the certification authority. The serial number is information which is set to make it possible for a certification authority issuing public key certificates to uniquely identify a public key certificate issued by the certification authority itself. The receiver acquires the CRL from the certification authority and certifies whether a serial number of a public key certificate attached to received data is stated in the CRL. If the serial number is stated in the CRL, the receiver judges that this public key certificate is revoked and is invalid. If the serial number is not stated in the CRL, the receiver judges that this public key certificate is valid.

In a case where the number of public key certificates issued by the certification authority is large and a large number of public key certificates are revoked, however, the capacity of the CRL becomes enormous. This results in a problem that it takes a time for a receiver who wants to confirm validity of a public key certificate attached to received data to acquire the CRL and conduct validity confirmation processing of the public key certificate. In order to cope with this, there is a validation server which is service of accepting a request to ascertain whether a public key certificate is revoked on line and giving a response to the request. And as one form of the validation server, there is the OCSP (Online Certificate Status Protocol) responder which confirms a state of a public key certificate by using the CRL. Its standard specifications are stipulated in non patent literature 1.

The OCSP responder periodically takes in the CRL issued by the certification authority, and accepts a revocation confirmation request (hereafter referred to as "validation request") of a public key certificate from a terminal (hereafter referred to as "terminal device") used by a receiver who conducts revocation confirmation of the public key certificate. Information (hereafter referred to as "CertID") for identifying a validation object certificate (a public key certificate of a validation object) is described in the validation request. A hash algorithm (hashAlgorithm) used by the terminal device, name information (issuerNameHash) of the certification authority that has issued the validation object certificate, key information (issuerKeyHash) of the certification authority, and a serial number (serialNumber) of the validation object certificate are included in the CertID. Among them, the name information of the certification authority and the key information of the certification authority are obtained by conducting a hash calculation on name data (issuerName) and key data (authorityKeyIdentifier) of the certification authority with a hash algorithm (hashAlgorithm) used by the terminal device.

Upon accepting a validation request, the OCSP responder checks whether the serial number of the validation object certificate is stated in the CRL previously taken in, and gives the terminal device a response as to whether the public key certificate which is this validation object certificate is revoked. In a response message (hereafter referred to as "response") of a validation result transmitted from the OCSP responder to the terminal device, the state of the validation object certificate is stated as valid (good), revoked, or unknown. In addition, a signature (hereafter referred to as "response signature") and a certificate (hereafter referred to as "OCSP certificate") of the OCSP responder that has conducted the validation are attached to the response. As a result, the user of the terminal device can confirm that the response is certainly transmitted by this OCSP responder.

By the way, all serial numbers of public key certificates that have been revoked at the time when the certification authority makes the CRL are stated in the CRL.

Furthermore, if the certification authority conducts key update of a private key, signature is conducted by using an updated new key in a public key certificate and a CRL issued after the key update. As for a public key certificate issued by a certification authority before key update, a case where the validity cannot be confirmed even within the term of validity occurs. A technique concerning an OCSP responder that validates the validity of a public key certificate issued by a certification authority no matter whether it is before or after the key update and gives a response to the receiver in such a case is disclosed in patent literature 1.

In recent years, jeopardizing of some encryption algorithms caused by advance of cryptanalysis techniques and capability enhancement of computers is pointed out. In 2005, jeopardizing of a hash function SHA-1 used in signature was announced by NIST (National Institute of Standards and Technology), and a change of the encryption algorithm from the existing SHA-1 to SHA-2 was intensely recommended. Upon receiving this, certificate authorities in various countries make it their principles to change the encryption algorithm used for the public key of the user and signature of the public key certificate to an encryption algorithm having higher safety while maintaining compatibility with an information system utilizing the existing encryption algorithm. Such jeopardizing of the encryption algorithm occurs at some definite intervals with the advance of the technique.

The change of the encryption algorithm caused by jeopardizing of the encryption algorithm causes occurrence of situations where an encryption algorithm in use differs every validation object certificate, every user (hereafter referred to as "user") who transmits a validation request to the OCSP responder, and every CRL issued by the certification authority. The OCSP responder needs to conduct validation even for a public key certificate using a signature according to an old encryption algorithm and a terminal device that copes with only an old encryption algorithm, and transmit a response. The OCSP needs to cope with a plurality of encryption algorithms.

Because of these situations, a selection method of the encryption algorithm for the response signature affixed to a validation result by the OCSP responder is under study in IETF (The Internet Engineering Task Force) which is a standardization drawing up organization as disclosed in non patent literature 2. In non patent literature 2, it is also possible for the user to set a PSA (Preferred Signature Algorithm), which is an encryption algorithm of a signature specified by the user, in a request extension (requestExtensions) area in a validation request and specify an encryption algorithm of a response signature affixed by the OCSP responder.

CITATION LIST

Patent Literature

PATENT LITERATURE 1: JP-A-2010-118858

Non Patent Literature

NON PATENT LITERATURE 1: "X.509 Internet Public Key Infrastructure Online Certificate Status Protocol OCSP (RFC 2560)", page 2 "2.1 Request" "2.2 Response", [online], June 1999, The Internet Engineering Task Force (IETF), [retrieved on May 12, 2011] Internet <URL:http://ietf.org/rfc/rfc2560.txt>

NON PATENT LITERATURE 2: "Online Certificate Status Protocol Algorithm Agility (RFC 6277)", [online], June 2011, The Internet Engineering Task Force (IETF), [retrieved on Jun. 14, 2011] Internet <URL: http://www.ietf.org/rfc/rfc6277.txt>

SUMMARY OF INVENTION

Technical Problem

In non patent literature 1, the change of the encryption algorithm is not considered, and consequently situations where the encryption algorithms used between concerned devices and users are different are not mentioned. Therefore, the problem that when the OCSP responder transmits a response to a user the OCSP responder cannot select an encryption algorithm to be used is not found.

In patent document 1, the response signature is affixed by using the same encryption algorithm as that of the certification authority. After specifying an OCSP certificate to be used for a response, the OCSP responder judges an encryption algorithm used in the signature of the certificate of the OCSP responder affixed by the certification authority, and conducts response signature. Furthermore, as a countermeasure at the time when the encryption algorithm is changed by key update of the certification authority, the OCSP responder has an OSCP certificate identification table, and manages a change of the encryption algorithm affixed to a CRL acquired from the certification authority. Owing to the method described heretofore, if the certification authority has conducted a change of the encryption algorithm, a response signature is affixed with a new encryption algorithm. If the certification authority does not yet cope with a change of the encryption algorithm, a response signature is affixed with an old encryption algorithm. If the user does not cope with a new encryption algorithm, therefore, a problem that an encryption algorithm with which the user cannot cope is selected and a response signature is affixed occurs.

In non patent literature 2, data to be considered in selecting an encryption algorithm of a response signature of the OCSP responder is stated. However, a concrete method as to how to refer to the data and select a response signature in the actual OCSP responder is not mentioned.

An object of the present invention is to provide a technique for determining an encryption algorithm of a response signature affixed to a validation result of a validation object certificate that is suitable to the user irrespective of the change situation of the encryption algorithm used in signature of a certificate.

Solution to Problem

One means for solving the problem will now be described. The present invention provides a determination method of an encryption algorithm to be used in a response signature affixed to a validation result of a certificate, in a validation server which conducts validation of certificates. The validation server judges validity of a certificate transmitted from a terminal device on the basis of revocation information of a plurality of certificates stored in a storage unit, and information of a certification authority and a certificate issued by the certification authority and information of an encryption algorithm included in a validation request transmitted from the terminal device. In a case where the certificate is valid, the validation server creates a validation result that the certificate transmitted from the terminal device is valid. Then, the validation server creates a selection list of encryption algorithms that can be used for a response signature affixed to the validation result of the certificate by using information of encryption algorithms included in the validation request and information of an encryption algorithm used in a signature of a certification authority that issued the certificate affixed to renovation information of the certificate. The validation server determines an encryption algorithm to be used for a response signature affixed to the validation result of the certificate.

Advantageous Effects of Invention

According to the present invention, it is possible to determine an encryption algorithm of a response signature affixed to a validation result of a validation object certificate that is suitable to the user irrespective of the change situation of the encryption algorithm used in signature of a certificate.

Other objects, features and advantages of the present invention will become apparent from the following description of embodiments of the present invention concerning accompanying drawings.

BRIEF DESCRIPTION OF DRAWINGS

FIG. 6 is a diagram showing an example of a certification authority identification table;

FIG. 8 is a diagram showing an example of a revocation information table;

FIG. 9 is a diagram showing an example of an OCSP certificate identification table;

FIG. 10 is a diagram showing an example of a request table;

FIG. 11 is a diagram showing an example of a signature policy table;

FIG. 12 is a diagram showing an example of a response signature algorithm selection list table;

FIG. 15 is a diagram showing a table example in a case where the OCSP certificate identification table is extended;

DESCRIPTION OF EMBODIMENTS

Hereafter, embodiments of the present invention will be described in detail with reference to the drawings.

First, terms used in description of the embodiments will be explained. In a PKI technique, a private key of a transmitter is used in a digital signature of the transmitter of electronic data. A certificate in which a certification authority certifies a public key paired with the private key of the transmitter and affixes a signature is a public key certificate. When the certification authority affixes a signature to the public key certificate, a private key of the certification authority is used. A public key certificate in which another certification authority certifies a public key paired with the private key of the certification authority is referred to as authority certificate. The embodiments will be described by taking an OCSP responder which is one form of a validation server providing revocation information of public key certificates as an example. The revocation information is provided as a validation response which is a validation result with a signature affixed thereto by using a private key of the OCSP responder. A certificate in which the certification authority certifies a public key paired with the private key of the OCSP responder is also a public key certificate. This certificate of the public key paired with the private key of the OCSP responder is referred to as OCSP certificate. As described heretofore, the public key certificate and the OCSP certificate are obtained by affixing a signature to information concerning the public key. However, these certificates include a certification authority name functioning as information identifying a certification authority which will be made clear by ensuing description, information identifying a public key certificate such as a serial number, and information concerning the terminal device, the certification authority and the OCSP responder certified by each of the certificates, as well. Furthermore, in the ensuing description, simple statement such as key update or private key update is used in some cases. However, a public key corresponding to the private key is also updated at the same time, and update of a pair of the private key and the public key is represented.

Embodiment 1

Figure 1:
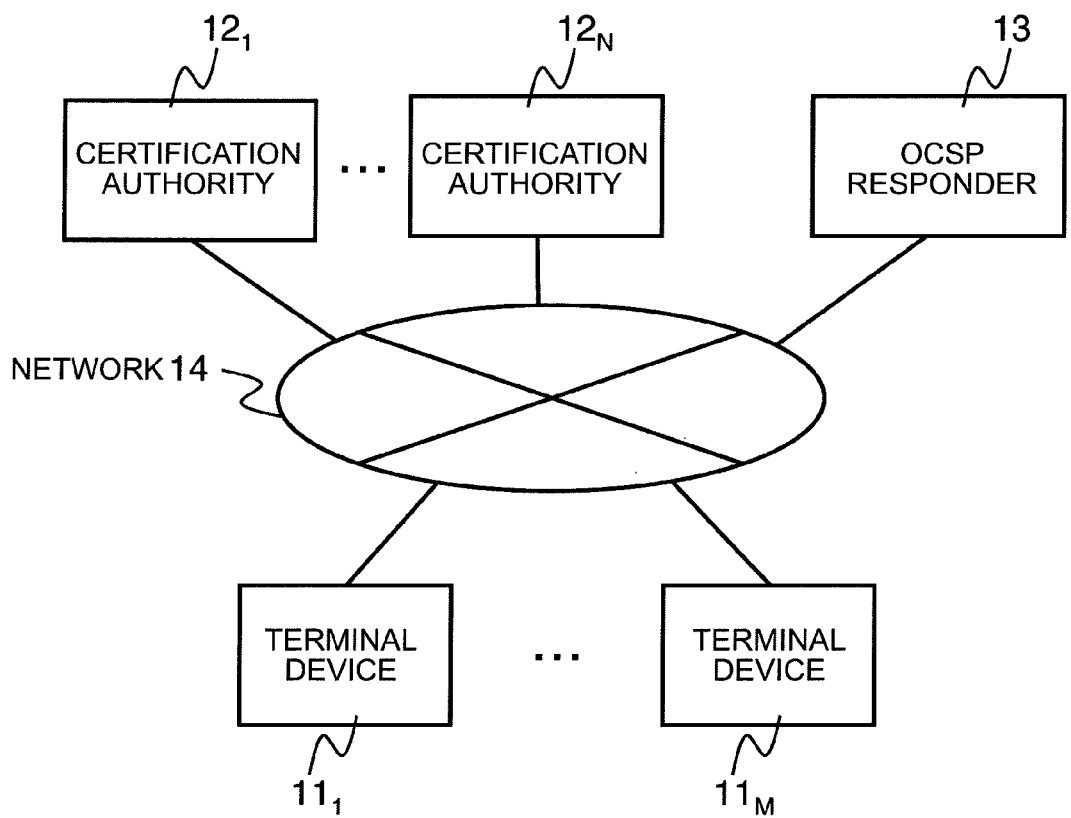
FIG. 1 is a diagram showing a configuration of a validation system according to embodiments of the present invention.

FIG. 1 is a diagram showing a general configuration example of a validation system concerning embodiments of the present invention. The validation system includes a plurality of terminal devices $11_1$ to $11_M$ which execute procedures (such as transmission of electronic data) electronically, certificate authorities $12_1$ to $12_N$ which issue and revoke public key certificates, an OCSP responder 13 which validates validities of public key certificates on the basis of revocation information (CRL) of public key certificates issued by the certificate authorities 12, and a network 14 such as Internet which connects them to each other.

Figure 2:
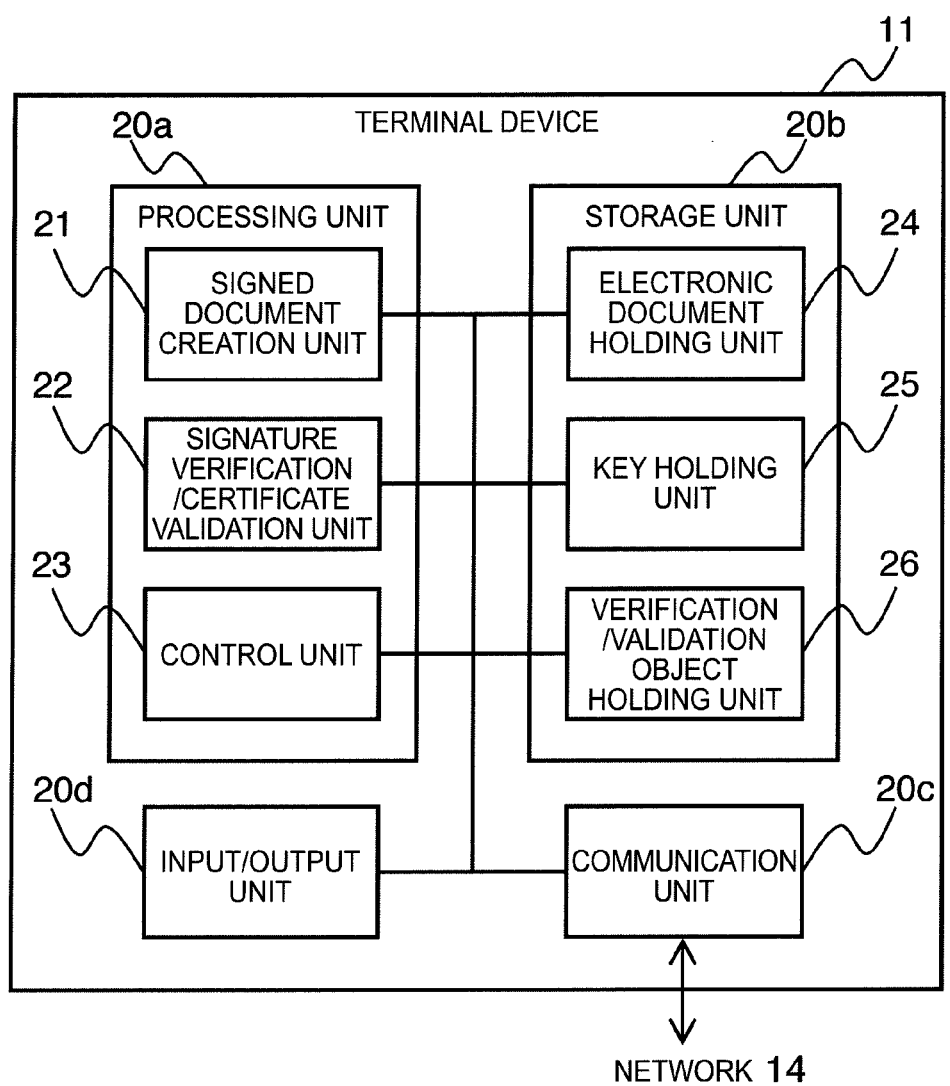
FIG. 2 is a diagram showing a configuration of a terminal device.

FIG. 2 shows a configuration of the terminal device 11. The terminal device 11 includes a processing unit 20a, a storage unit 20b, a communication unit 20c for communicating with other devices via the network 14, and an input/output unit 20d which conducts input/output of an electronic document created by a user of the terminal device 11 and electronic documents received from other terminal devices 11 and accepts an order from the user.

In the ensuing description of the terminal device 11, a public key certificate affixed when transmitting an electronic document created by a user of the terminal device 11 to other terminal devices 11 is referred to as own public key certificate and a public key certificate affixed when transmitting an electronic document received from another terminal device 11 is referred to as foreign public key certificate in order to make the description apprehensible.

The processing unit 20a includes a signed document creation unit 21 which creates a signed electronic document, i.e., an electronic document with a signature affixed thereto, by using a private key of the terminal device 11, a signature verification/certificate validation unit 22 which conducts verification on signatures in signed electronic documents transmitted from other terminal devices 11 and conducts validation on foreign public key certificates, and a control unit 23 which controls respective units in the terminal device 11.

The storage unit 20b includes an electronic document holding unit 24 which holds electronic documents created by the user, a key holding unit 25 which holds a private key for generating a signature, an own public key certificate issued from a certification authority 12 of a public key paired with this private key, and a authority certificate of a certification authority 12 used by this terminal device 11, and a verification/validation object holding unit 26 which holds a signed electronic document and a foreign public key certificate received from another terminal device 11.

The control unit 23 accepts an order to transmit an electronic document held in the electronic document holding unit 24 to another user, from a user utilizing the terminal device 11 via the input/output unit 20*d*. In response to the transmission order, the control unit 23 reads out the specified electronic document from the electronic document holding unit 24, and delivers the specified electronic document to the signed document creation unit 21. The signed document creation unit 21 generates a signature for the delivered electronic document by using a private key held in the key holding unit 25, and creates a signed electronic document by affixing the generated signature to the electronic document. The control unit 23 transmits the signed electronic document generated by the signed document creation unit 21 and the own public key certificate held in the key holding unit 25 to a terminal device 11 of transmission destination ordered by the user, via the communication unit 20*c*.

Furthermore, upon receiving a signed electronic document and a foreign public key certificate from another terminal device 11 via the communication unit 20*c*, the control unit 23 associates them with each other, causes the verification/validation object holding unit 26 to hold them, and requests the signature verification/certificate validation unit 22 to conduct verification/validation on them.

Upon receiving the verification/validation request of the signed electronic document and the foreign public key certificate, the signature verification/certificate validation unit 22 verifies the signature of the signed electronic document held in the verification/validation object holding unit 26 by using the foreign public key certificate held in association with the signed electronic document. And the signature verification/certificate validation unit 22 regards the foreign public key certificate used to verify the signature in the signed electronic document as a validation object certificate, and validates the foreign public key certificate by using the authority certificate of the certification authority 12 held in the key holding unit 25. The signature verification/certificate validation unit 22 executes verification/validation processing such as verification of a signature in the validation object certificate, confirmation that the term of validity does not expire, and ascertainment whether the validation object certificate is revoked.

The signature verification/certificate validation unit 22 transmits a validation request to the OCSP responder 13 in order to ascertain whether the validation object certificate (the foreign public key certificate of validation object) is revoked. In a case where the verification/validation processing is successful inclusive of reception of a validation result that the validation object certificate is not revoked from the OCSP responder 13, the signature verification/certificate validation unit 22 regards the validation object certificate as valid and regards the signed electronic document accompanied by the validation object certificate as legal. As occasion demands, the signature verification/certificate validation unit 22 outputs a verification/validation result of the signature in the signed electronic document and the validation object certificate via the input/output unit 20*d*.

Figure 3:
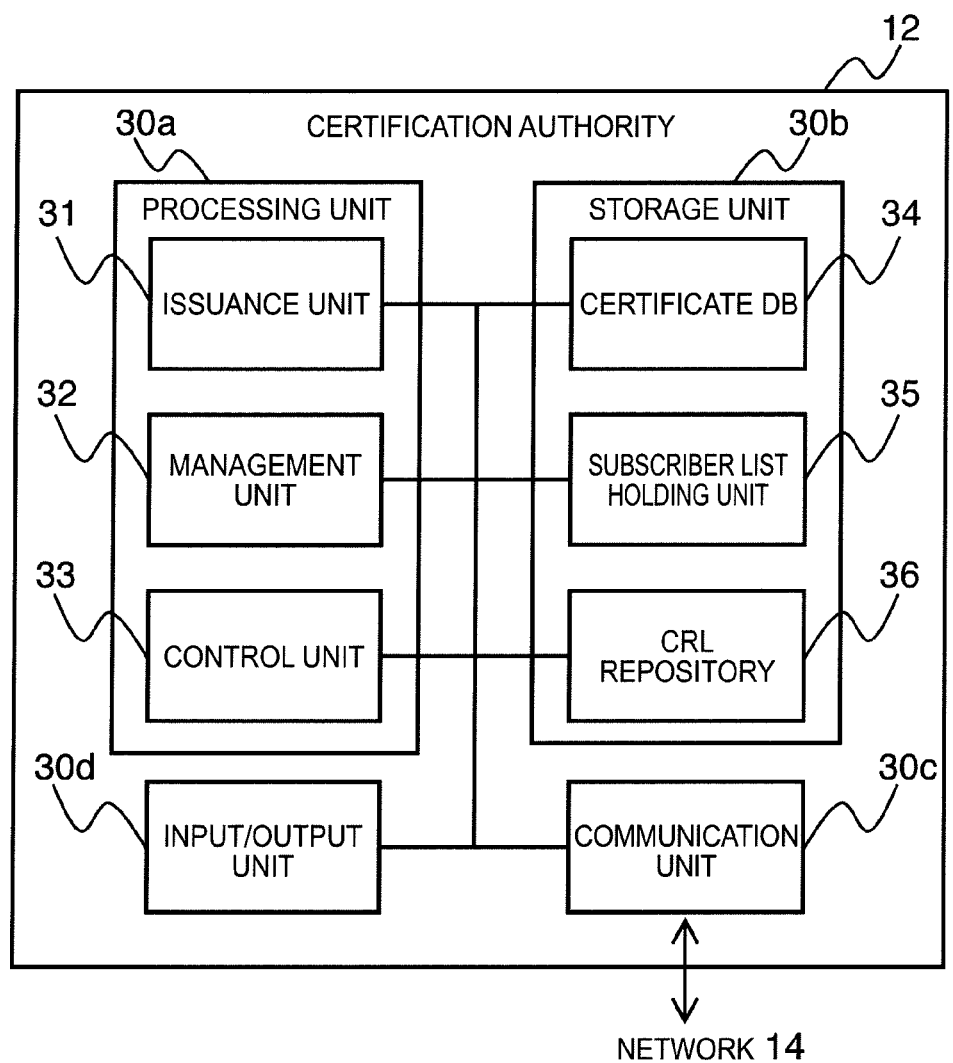
FIG. 3 is a diagram showing a configuration of a certification authority.

FIG. 3 is a diagram showing a configuration of the certification authority 12. The certification authority 12 includes a processing unit 30*a*, a storage unit 30*b*, a communication unit 30*c* for communicating with other devices via the network 14, and an input/output unit 30*d* which conducts input/output of various certificates and the like, acceptance of an order from an operator of the certification authority 12, and output of a processing result.

The processing unit 30*a* includes an issuance unit 31 which issues a public key certificate, a management unit 32 which manages the public key certificate issued by the issuance unit 31, and a control unit 33 which controls respective units in the certification authority 12.

The storage unit 30*b* includes a certificate database (hereafter referred to as "certificate DB") 34 which holds the public key certificate issued by the issuance unit 31, a subscriber list holding unit 35 which holds a subscriber list describing subscribers of respective public key certificates held in the certificate DB 34, and a CRL repository 36 which holds a CRL describing revocation information of public key certificates.

In the same way as the processing in patent document 1, the certification authority 12 accepts an issuance request of a public key certificate, creates a public key certificate corresponding to the issuance request, and affixes a signature to a public key certificate created by using a private key of the certification authority 12. And the certification authority 12 delivers the created public key certificate to an issuance request source via the input/output unit 30*d* or the communication unit 30*c* by mail or communication.

Furthermore, in the same way as processing in patent document 1, upon accepting a revocation request of an public key certificate, the management unit 32 in the certification authority 12 eliminates an public key certificate of a revocation object from the certificate DB 34, and eliminates information of the subscriber of the public key certificate from the subscriber list held in the subscriber list holding unit 35. And the management unit 32 periodically creates a CRL describing serial numbers of public key certificates eliminated from the certificate DB 34, and affixes a signature to the CRL by using the private key of the certification authority 12. Upon accepting a CRL acquisition request from another device such as the OCSP responder 13 via the communication unit 30*c*, the control unit 33 transmits the CRL held in the CRL repository 36 to the device that has issued the CRL acquisition request via the communication unit 30*c*.

Figure 4:
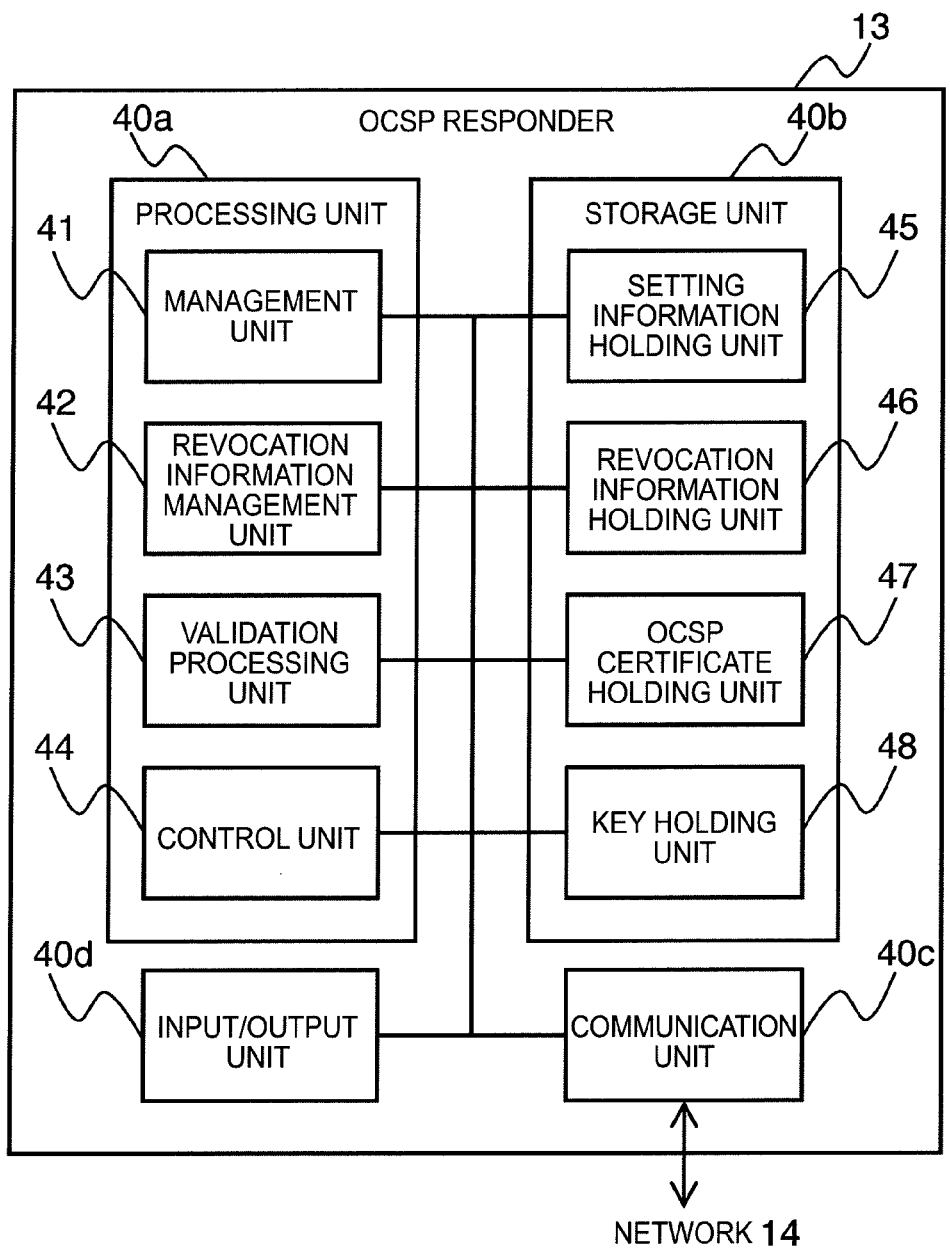
FIG. 4 is a diagram showing a configuration of an OCSP responder.

FIG. 4 is a diagram showing a configuration of the OCSP responder 13. The OCSP responder 13 includes a processing unit 40*a*, a storage unit 40*b*, a communication unit 40*c* for communicating with other devices via the network 14, and an input/output unit 40*d* which conducts input/output of various certificates and the like, and acceptance of an order from an operator of the OCSP responder 13.

The processing unit 40*a* includes a management unit 41, a revocation information management unit 42, a validation processing unit 43, and a control unit 44 which controls respective units in the OCSP responder.

The storage unit 40*b* includes a setting information holding unit 45, a revocation information holding unit 46, an OCSP certificate holding unit 47, and a key holding unit 48 which holds a private key of the OCSP responder 13.

The management unit 41 registers various kinds of setting information such as a signature policy table 110 and CRL update timing, which will be described later, into the setting information holding unit 45. Furthermore, the management unit 41 creates an OCSP certificate identification table 90, which will be described later, from the authority certificate and the OCSP certificate, and registers the OCSP certificate identification table 90 into the OCSP certificate holding unit 47.

The revocation information management unit 42 accesses the certification authority 12 via the communication unit 40*c*, acquires the CRL, creates a revocation information table 80, which will be described later, from the acquired CRL, and registers the revocation information table 80 into the revocation information holding unit 46. And the revocation information management unit 42 acquires a CRL in accordance with CRL update timing, which is previously set in the setting information holding unit 45, and updates the revocation information table 80 in the revocation information holding unit 46.

Upon receiving a validation request from the terminal device 11 via the communication unit 40c, the validation processing unit 43 refers to a certification authority identification table 60 and the revocation information table 80, which are held in the revocation information holding unit 46, and ascertains whether a validation object certificate, for which the validation request is issued, is already revoked. And the validation processing unit 43 refers to the OCSP certificate identification table 90, acquires an OCSP certificate corresponding to the validation request, and creates validation result data. And the validation processing unit 43 determines a response signature algorithm at the time when affixing a signature to the validation result data, from the signature policy table 110 and a response signature algorithm selection list table 120, which will be described later. A signature is affixed to the validation result data according to a determined response signature algorithm by using the private key of the OCSP responder 13 held in the key holding unit 48, and the validation result data is transmitted to the terminal device 11 via the communication unit 40c together with the OSCP certificate.

Into the setting information holding unit 45, an encryption algorithm of a default of the OCSP responder and an encryption algorithm that is inevitably used in each version for respective versions of an OCSP protocol are registered previously.

Furthermore, the OCSP responder 13 indicated in the present embodiment conducts setting operation of a certification authority in the same way as patent document 1, and holds the authority certificate and an object identifier (OID) of a hash algorithm that can be accepted in the setting information holding unit 45. In a case where the OCSP responder 13 accepts a plurality of hash algorithms, OIDs of the plurality of hash algorithms are set in the same way and one of them is registered as a reference hash algorithm. The OCSP responder 13 creates the certification authority identification table 60 on the basis of the registered authority certificate and the reference hash algorithm, and holds the certification authority identification table 60 in the revocation information holding unit 46. In a case where the OCSP responder 13 corresponds to a plurality of certificate authorities (takes in CRLs issued by a plurality of certificate authorities 12), the OCSP responder 13 registers authority certificates of respective certificate authorities in the same way. Furthermore, in a case where the certification authority 12 has updated the private key, authority certificates containing public key information corresponding to private keys of respective generations for which the term of validity does not expire are held. By the way, with update of key information of the certification authority, the OCSP responder may receive an authority certificate from the certification authority 12 via the network 14 and register the authority certificate.

Figure 5:
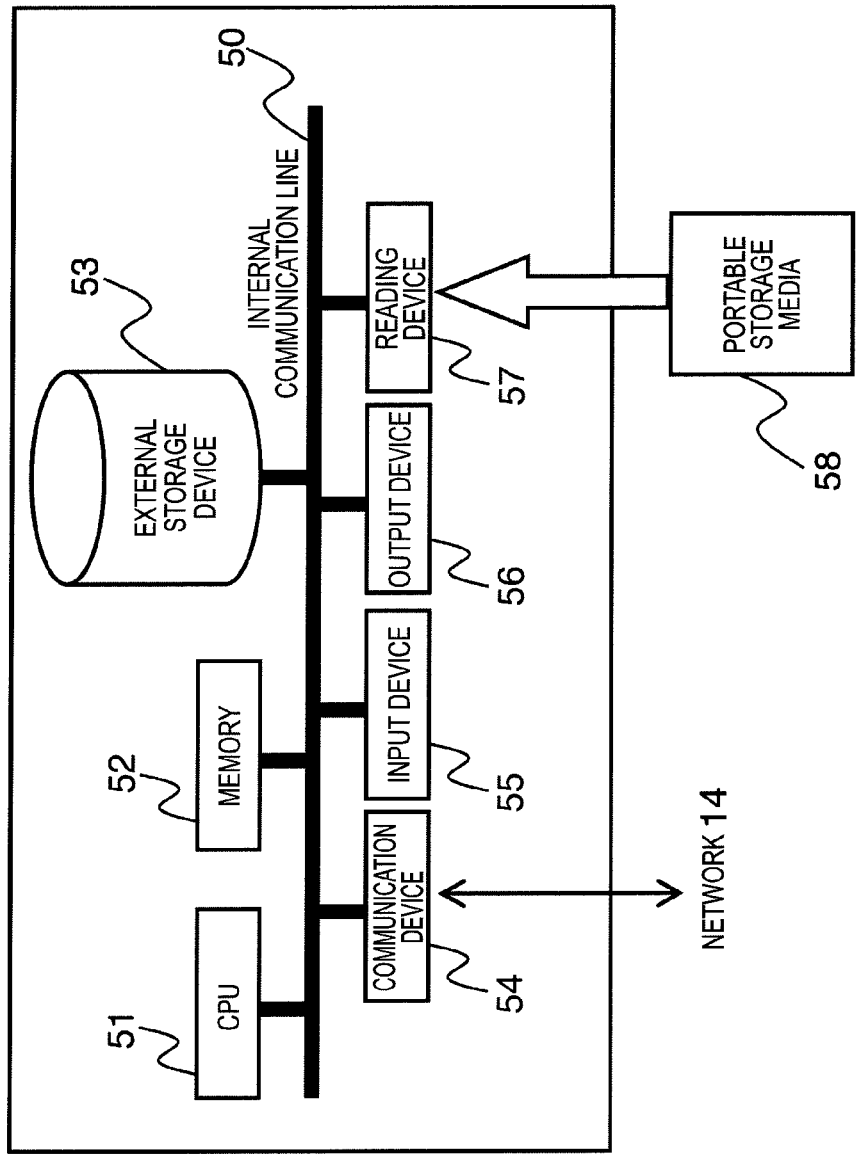
FIG. 5 is a diagram showing a hardware configuration example of each of the terminal device, the certification authority, and the OCSP responder.

FIG. 5 is a diagram showing a hardware configuration example of each of the terminal device 11, the certification authority 12, and the OCSP responder 13. Each of the terminal device 11, the certification authority 12, and the OCSP responder 13 is an ordinary computer including a CPU (Central Processing Unit) 51 which conducts various kinds of processing, arithmetic operations, and control of the whole device, a memory 52, an external storage device 53 such as a hard disk which stores various programs and data, a communication device 54 for conducting communication with other devices via the communication network 14, an input device 55 such as a keyboard and buttons, an output device 56 such as a monitor or a printer, a reading device 57 which reads information from portable storage media 58 such as a CD-ROM or a USB, and an internal communication line (for example, a bus) 50 which conducts data transmission and reception between these devices. The CPU 51 implements the above-described processing units by loading various programs from the external storage device 53 to the memory 52 and executing predetermined programs. In other words, the processing units 20a, 30a and 40a are implemented as processing processes in the CPU 51, and the storage units 20b, 30b and 40b are implemented as a result of utilization of the memory 52 and the external storage device 53 conducted by the CPU 51. Furthermore, the communication units 20c, 30c and 40c are implemented as a result of utilization of the communication device 54 conducted by the CPU 51. The input/output units 20d, 30d and 40d are implemented as a result of utilization of the input device 55, the output device 56, and the reading device 57 conducted by the CPU 51. The predetermined program that implements each of the processing units may be previously stored in the external storage device 53, may be previously stored in the portable storage media 53 available to the computer and read out via the reading device 57 as occasion demands, or may be downloaded from a network which is communication media available to the computer or another device connected to the communication device 54 utilizing a carrier wave propagating on the network and stored in the external storage device 53 as occasion demands.

FIG. 6 is a diagram showing an example of the certification authority identification table 60 provided in the revocation information holding unit 46 in the OCSP responder 13. The certification authority identification table 60 includes pairs 62 to 65, each of which is a pair of a hash value of a subject name (subject) described in the authority certificate and a hash value of a public key (subjectPublicKeyInfo) found by using a hash algorithm that can be accepted by the OCSP responder 13 and, and an identifier (ID) 66 of a certification authority that has issued the authority certificate, in association with a name of the authority certificate 61. The certification authority identification table 60 is created by the management unit 41 as described hereafter. The management unit 41 acquires an authority certificate held in the setting information holding unit 45, and describes a name of the acquired authority certificate in a row of the authority certificate 61 in the certification authority identification table 60. The management unit 41 refers to the OID of the hash algorithm held in the setting information holding unit 45, calculates a hash value of the subject name (subject) described in the authority certificate and a hash value of the public key (subjectPublicKeyInfo) by using the hash algorithm, and describes a pair of the two values in a corresponding place in the certification authority identification table 60.

For example, in FIG. 6, the OCSP responder 13 is set to confirm revocation of public key certificates issued by a certification authority 1 (CA1), a certification authority 2 (CA2), and a certification authority 3 (CA3). It is indicated that the certification authority 1 (CA1) updates a key and a new authority certificate (CA1_new certificate) issued after the update and an old authority certificate (CA1_old certificate) issued before the update are valid (within the term of validity). As for the certification authority 2 (CA2) as well, it is indicated that a new authority certificate (CA2_new certificate) and an old authority certificate (CA2_old certificate) are valid in the same way as the certification authority 1 (CA1). Furthermore, it is indicated that as hash algorithms that can be accepted by the OCSP responder 13 there are SHA-1, SHA-256, SHA-512, and an arbitrary hash algorithm.

Taking a case where the authority certificate is the new authority certificate (CA1_new certificate) of the certification authority 1 (CA1) as an example, a relation between a pair of a hash value of a subject name (subject) and a hash value of a public key (subjectPublicKeyInfo) and the authority certificate will now be described. A hash value of a subject name (subject) described in the CA1_new certificate and a hash value of a public key (subjectPublicKeyInfo) are calculated by using the SHA-1 algorithm, and a pair of calculation results is described in a row of a hash value (SHA-1) 62 in a column of the CA1_new certificate in the certification authority identification table 60. In the same way, pairs of hash values calculated by using the hash algorithms SHA-256, SHA-512, and an arbitrary hash algorithm are described in a row of a hash value (SHA-256) 63, a row of a hash value (SHA-512) 64, and a row of a hash value (an arbitrary hash algorithm) 65, respectively. A hash value of a subject name (subject) described in the authority certificate is set to be the authority identifier (ID) 66 of the authority certificate. In FIG. 6, the reference hash algorithm is set to be SHA-1. The case of the certification authority 1 (CA1) will now be described. As for the new authority certificate (CA1_new certificate) and the old authority certificate (CA1_old certificate) with key update between, hash values of the public key (subjectPublicKeyInfo) are different from each other. Since the certification authority 1 (CA1) is the same, however, a hash value "12345" of its subject name (subject) is also the same. By the way, a pair of a hash value of the subject name (subject) and a hash value of the public key (subjectPublicKeyInfo) calculated by using the reference hash algorithm is used as the authority certificate identifier (ID) 62.

An operator of the OCSP responder 13 previously conducts setting of update timing of the CRL. Specifically, the OCSP responder 13 inputs timing to update the CRL every corresponding certification authority via the input/output unit 40d, and the management unit 41 in the OCSP responder 13 registers this CRL update timing into the setting information holding unit 45.

Figure 7:
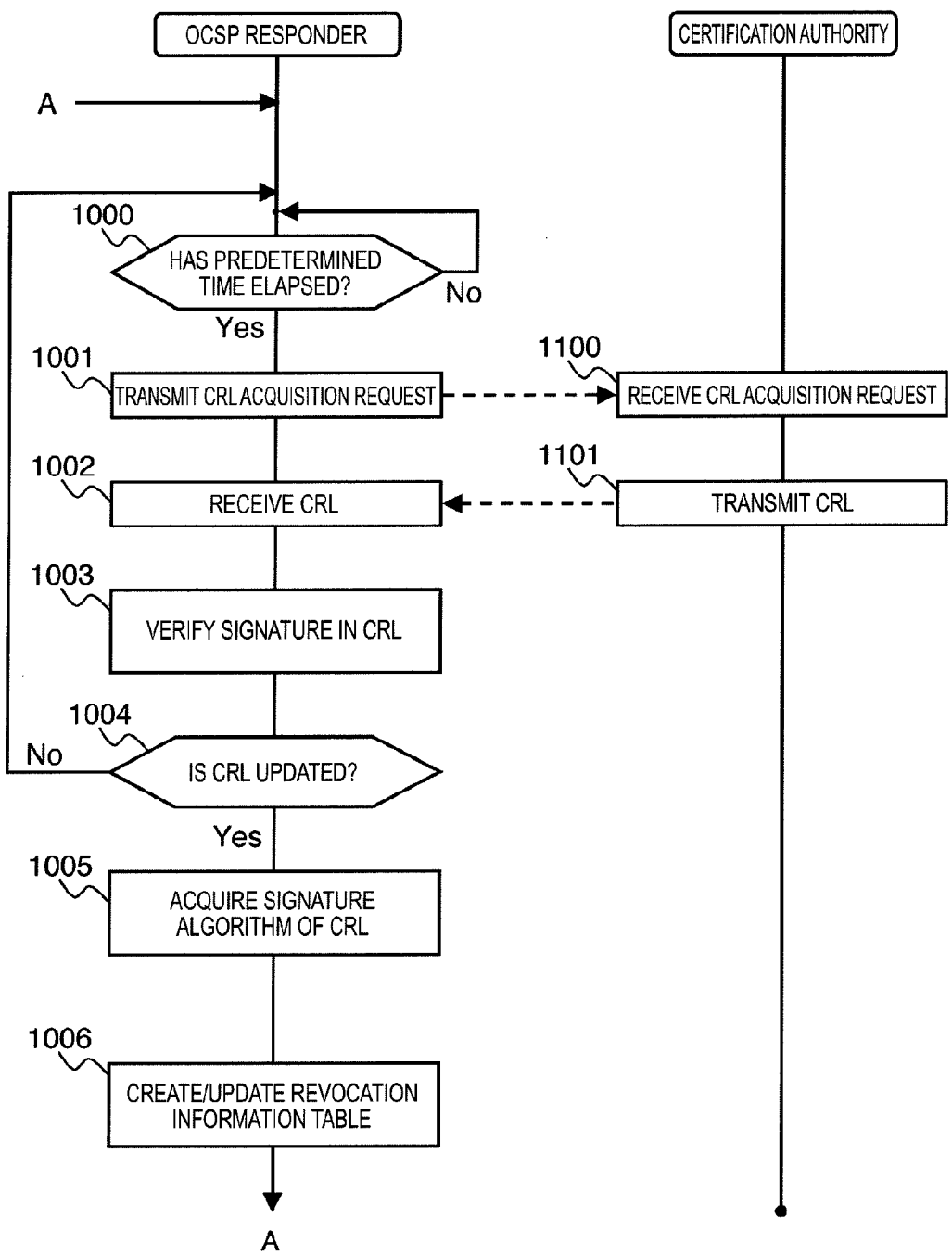
FIG. 7 is a flow chart of CRL update processing in the OCSP responder.

FIG. 7 shows a flow chart of CRL update processing executed by the OCSP responder. The revocation information management unit 42 in the OCSP responder 13 ascertains whether CRL update timing (for example, one day) previously set in the setting information holding unit 45 has elapsed (1000). If the timing has elapsed, the revocation information management unit 42 transmits a CRL acquisition request to the certification authority 12 via the communication unit 40c (1001). Upon receiving the CRL acquisition request (1100), the certification authority 12 affixes a signature to the CRL by using a private key of the certification authority 12, and transmits the resultant CRL to the OCSP responder 13 (1101). In this CRL, a name (issuer) of the certification authority 12, key information (authorityKeyIdentifier) of the certification authority 12, a serial number (serialNumber) of revoked public key certificate included in public key certificates in the term of validity issued by the certification authority 12, the term of validity of the CRL (CRL creation date and hour, next CRL creation date and hour) and the like at the time when the CRL is created are stated. Upon receiving the CRL from the certification authority 12 (1002), the revocation information management unit 42 in the OCSP responder 13 verifies a signature of the certification authority stated in the CRL by using the authority certificate (the public key certificate of the certification authority 12) (1003), and ascertains whether the received CRL is updated (1004). The date and hour when the CRL was created by the certification authority 12 is stated in the CRL. If the date and hour of creation of the CRL received from the certification authority 12 is later than the date and hour of CRL creation acquired last time, therefore, the revocation information management unit 42 judges that the CRL of the certification authority 12 is updated and proceeds to step 1005. If the received CRL of the certification authority is not updated, the processing proceeds to the step 1000. By the way, if the CRL is received from the certification authority 12 for the first time, the processing proceeds to the step 1005. Subsequently, the revocation information management unit 42 in the OCSP responder 13 conducts creation or update of the revocation information table 80, and stores the resultant revocation information table 80 into the revocation information holding unit 46 (1006).

FIG. 8 shows an example of the revocation information table 80. In the revocation information table 80, an OID (object ID) 82 of a signature algorithm of the CRL, a validity period 83 of the CRL, a serial number (userCertificate) 84 of a revoked certificate, a revocation date and time 85 of the certificate, a reason code 86 of the certificate revocation, and a signature algorithm 87 used to sign CRL which is an encryption algorithm used in a signature of a certification authority affixed to the acquired CRL are stored in association with an authority identifier (ID) 81.

The revocation information table 80 is created or updated as described hereafter. The revocation information management unit 42 in the OCSP responder 13 specifies a corresponding authority certificate from among authority certificates registered in the setting information holding unit 45 by using values of an issuer name (issure) and a certification authority key identifier (authorityKeyIdentifier) as a key, and acquires the specified authority certificate. The revocation information management unit 42 finds an authority identifier 66 registered in the certification authority identification table 60 from the acquired authority certificate by using the reference hash algorithm. The revocation information management unit 42 retrieves the same authority identifier from an authority identifier 81 column in the revocation information table 80 by using the found authority identifier as a key. By the way, if the same authority identifier does not exist, the revocation information management unit 42 judges the CRL to be a CRL of a new certification authority 12, and adds the found authority identifier to the authority identifier 81 column in the revocation information table 80. Subsequently, the revocation management unit 42 describes or updates an object ID (OID) of an encryption algorithm (signatureAlgorithm) used in a signature affixed to the CRL by a certification authority that has issued the CRL, and a term of validity (thisUpdate, nextUpdate) in the OLD of signature algorithm 82 column and the CRL term of validity 83 column corresponding to the retrieved authority identifier 81. Subsequently, the revocation information management unit 42 registers a serial number of a revoked public key certificate described in the CRL into the serial number of revoked certificate 84 column, registers a revocation date and hour of a revoked certificate into the revocation date and hour of certificate 85 column, and registers a pertinent revocation reason into the revocation reason of certificate 86 column. By the way, as for the revocation reason (reasonCode), meanings corresponding to its Nos. are stipulated in RFC 5280. Subsequently, the revocation information management unit 42 registers an encryption algorithm used in a signature of a CRL issued by the certification authority 12 into the column of the signature algorithm 87 used to sign CRL.

For example, it is supposed that a certification authority 1 having "12345" as the authority identifier 81 updates a key at 2010/9/30/24:00, an authority certificate identifier corresponding to an old authority certificate (CA1_old certificate) before update is "12345/aabce," and an authority certificate identifier corresponding to a new authority certificate (CA1_new certificate) after update is "12345/abcde." In this case, serial numbers "3" and "5" in the serial number of revoked certificate 84 column in the revocation information table 80 are serial numbers of public key certificates issued by the certification authority 1 before the key of the certification authority is updated. Serial numbers "122," "123" and "200" are serial numbers of public key certificates issued by the certification authority 1 after the key of the certification authority is updated. These serial numbers are included in a CRL corresponding to a authority certificate (CA1_new certificate) using a key under the present situation (a key after the update) no matter whether they are serial numbers before or after the key update.

FIG. 9 shows an example of the OCSP certificate identification table 90. The OCSP certificate identification table 90 includes an authority certificate file name 92 and an OCSP certificate file name 93 in association with an authority certificate identifier (ID) 91.

An operator of the OCSP responder 13 inputs an authority certificate and an OCSP certificate to the OSCP responder 13 via the input/output unit 40d. In a case where the OCSP responder 13 corresponds to a plurality of certificate authorities 12, the operator of the OCSP responder 13 inputs an authority certificate of a certification authority 12 and an OCSP certificate issued by the certification authority 12 in the same way. Furthermore, in a case where a certification authority 12 updates a private key and issues authority certificates of a plurality of generations, the operator of the OCSP responder 13 inputs a authority certificate corresponding to a new private key, an authority certificate corresponding to an old private key, an OCSP certificate issued from a certification authority 12 of the new private key, and an OCSP certificate issued from a certification authority 12 of the old private key (in a case where there are old private keys of a plurality of generations, all authority certificates of those private keys and all OSCP certificates issued from those certificate authorities 12 within the term of validity) in the same way. As a result, authority certificates of all generations within the term of validity coped with by the OCSP responder 13 and all OCSP certificates issued from certificate authorities 12 of them are registered in the OCSP certificate holding unit 47 in the OCSP responder 13. By the way, as for the input of the authority certificates, it is efficient if the input of the authority certificates is conducted at once while serving for holding them in the setting information holding unit 45 as described earlier as well. The management unit 41 in the OCSP responder 13 creates the OCSP certificate identification table 90 on the basis of the registered authority certificates and OCSP certificates, and causes the setting information holding unit 45 to hold the OCSP certificate identification table 90.

The authority certificate identifier 91 is a pair of two values respectively calculated by using the reference hash algorithm, a hash value of a subject name (subject) described in an authority certificate and a hash value of a public key (subjectPublicKeyInfo) described in the authority certificate. The management unit 41 in the OCSP responder 13 registers a file name of an authority certificate in a row of the authority certificate 92 and describes a file name of an OCSP certificate in a row of the OCSP certificate file name 93, in association with the each authority certificate identifier 91.

FIG. 10 shows an example of a request table 100. The request table 100 includes an issuerNameHash/issuerKeyHash 102, a serial number 103, a PSA (Preferred Signature Algorithm) 104, and a signature algorithm 105 to sign OCSP request in association with a request identifier 101.

The request table 100 is created as described hereafter. Upon accepting a validation request from a user, the OSCP responder 13 registers name information (issuerNameHash) of a certification authority that issued a validation object certificate included in the CertID and key information (issuerKeyHash) of the certification authority into an issuerNameHash/issuerKeyHash 102 column, and registers a serial number of the validation object certificate included in the CertID into a serial NO. 103 column. Furthermore, in a case where a PSA is stated in a request extension (requestExtensions) area in a validation request, the OCSP responder 13 registers the PSA into a PSA 104 column. In a case where a plurality of PSA's are stated in the validation request, the OCSP responder 13 registers all of the PSA's into the PSA 104 column in order in which they are stated. Furthermore, in a case where the validation request has a signature (request signature) of a user affixed thereto, the OCSP responder 13 registers an encryption algorithm of the request signature into a column of a signature algorithm 105 used to sign OCSP request. Furthermore, in a case where a PSA is not specified in the validation request or a request signature is not affixed, the OCSP responder 13 leaves a pertinent PSA 104 column and a column of a pertinent signature algorithm 105 used to OCSP request blank. The request table 100 is created every validation request, and held on a memory in the OCSP responder 13. Here, the request identifier 101 is an ID of a process that conducts processing on the validation request, a thread ID, date and hour data, an IP address and a port number of a user, or the like. The request identifier 101 is not especially restricted.

FIG. 11 shows an example of a signature policy table 110. The signature policy table 110 holds a list of algorithms the OCSP responder 13 can cope with as a list in order of priority. As shown in FIG. 11, the signature policy table 110 stores a response signature algorithm 112 in association with S111 which indicates a column number in the table. In the signature policy table 110, encryption algorithms for each of which the OSCP responder 13 holds a private key and can sign are described. The encryption algorithms are provided with priority orders in order beginning with an encryption algorithm of a response signature specified as a default by the OCSP responder 13, and are registered. The signature policy table 110 is previously created by the operator of the OCSP responder 13, and held in the setting information holding unit 45 in the OCSP responder 13. Here, for example, among encryption algorithms stated in the response signature algorithm 112 column, an encryption algorithm that is younger in number in the S111 column is set to have a higher priority. The signature policy table 110 shown in FIG. 11 is an example, and the signature policy table 110 may be held in a list form instead of the table form.

FIG. 12 shows an example of a response signature algorithm selection list table 120. The response signature algorithm selection list table 120 includes an item 122, a column number U123, and an encryption algorithm 124 in association with T121 which indicates a column number in the table. T121 indicates a priority order of an encryption algorithm used in a response signature. The item 122 indicates a specified place of the encryption algorithm. U123 indicates a numerical value for distinction in a case where there are a plurality of encryption algorithms for one item. The encryption algorithm 124 indicates an encryption algorithm corresponding to the item 122. Furthermore, the response signature algorithm selection list table 120 is created every validation request from a user, and held on the memory in the OCSP responder 13. The response signature algorithm selection list table 120 shown in FIG. 12 is an example, and may be held in a list form instead of the table form. Furthermore, the response signature algorithm selection list table 120 shown in FIG. 12 is created by acquiring an encryption algorithm pertinent to the item 122 from each specified place and registering it into the encryption algorithm 124. As for the encryption algorithm 124, a specified place of an encryption algorithm may be specified by a pointer or the like instead of actually registering an encryption algorithm name.

In addition, in the present embodiment, the item 122 and its priority order are set in accordance with a selection sequence of an encryption algorithm of the response signature stated in non patent literature 2. As for the contents and priority order of the item 122, however, setting can be changed according to the policy of the OCSP responder 13 or the like.

Operation of validation processing for ascertaining whether a public key certificate is revoked in the present embodiment will now be described.

Figure 13:
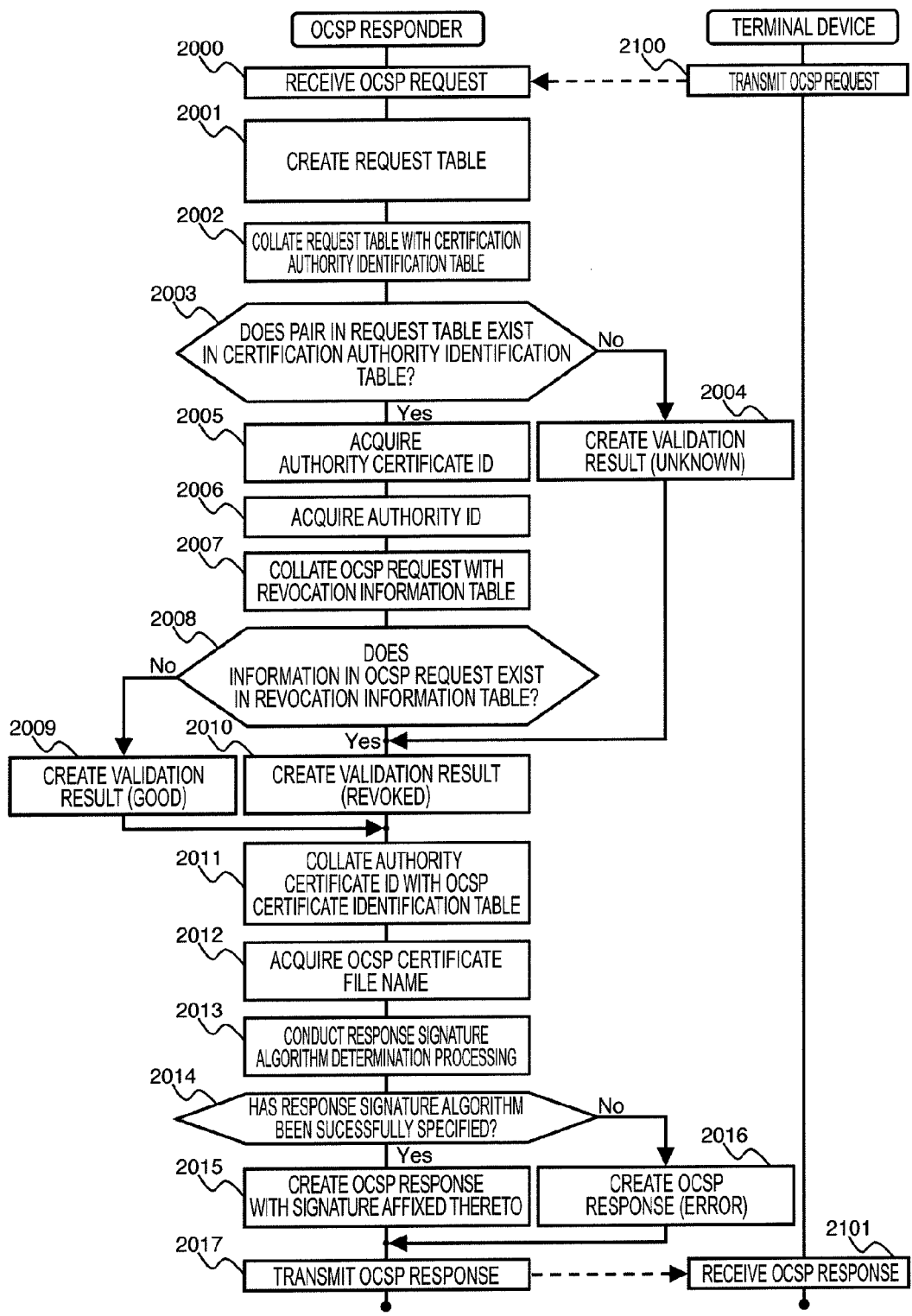
FIG. 13 is a flow chart of validation processing of a public key certificate in the OCSP responder.

FIG. 13 is a diagram showing a flow chart of validation processing of a public key certificate executed by the OCSP responder 13.

The signature verification/certificate validation unit 22 in the terminal device 11 creates a validation request (OCSP request) in order to ascertain whether a public key certificate (foreign public key certificate at the time of description with reference to FIG. 2) appended to an electronic document transmitted from another terminal device 11 is revoked, and transmits the validation request to the validation server 13 via the communication unit 20c (step 2100). Upon receiving the validation request (2000), the validation processing unit 43 in the OCSP responder 13 acquires a request identifier, a CertID, a PSA (Preferred Signature Algorithm), and a request signature algorithm included in the validation request, and creates the request table 100 (2001). Here, in a case where a plurality of PSAs included in the validation request are set, all PSAs which are set are stated in the request table 100 in order in which the PSAs are set. Furthermore, there may be a case where a PSA is not specified or a request signature is not affixed. In a case where each information is not included in the validation request, the pertinent PSA 104 column or the column of the signature algorithm 105 used to sign OCSP request is made blank. Subsequently, the validation processing unit 43 conducts collation on the certification authority identification table 60 held in the information holding unit 46 by using the issureNameHash/issureKeyHash 102 as a key (2002), and ascertains whether the pair of issureNameHash/issureKeyHash stated in the request table 100 exists in the certification authority identification table 60 (2003). In a case where the pair of issureNameHash/issureKeyHash stated in the request table 100 does not exist in the certification authority identification table 60, revocation information corresponding to this validation request is not held. Therefore, the validation processing unit 43 creates validation result data in which revocation information (CertStatus) of a validation object certificate is set to be unknown (2004), and proceeds to step 2010. In a case where the pair of issureNameHash/issureKeyHash stated in the request table 100 exists in the certification authority identification table 60, the validation processing unit 43 acquires an authority certificate identifier corresponding to the pair of issureNameHash/issureKeyHash (2005), and further acquires an authority identifier corresponding to the authority certificate identifier (2006). Subsequently, the validation processing unit conducts collation of the validation request with the revocation information table 80 (2007). The validation processing unit 43 searches the authority identifier 81 in the revocation information table 80 by using the authority identifier acquired at the step 2006 as a key, and specifies the same authority identifier 81 as the acquired authority identifier. Subsequently, the validation processing unit 43 compares a serial number of a validation object certificate (serialNumber in CertID) included in the validation request with a serial number of revoked certificate 84 corresponding to the identified authority identifier 81, and ascertains whether the serial number of the validation object certificate is stated in the serial number of revoked certificate 84 in the revocation information table 80 (2008). In a case where the serial number of the validation object certificate included in the validation request does not exist in the revocation information table 80, the validation processing unit 43 creates validation result data in which the revocation information of the validation object certificate (CertStatus) is set to be valid (good) (2009) and proceeds to step 2011. In a case where the serial number of the validation object certificate exists in the revocation information table 80, the validation processing unit 43 creates validation result data in which the revocation information of the validation object certificate (CertStatus) is set to be revoked (2010) and proceeds to step 2011. Subsequently, the validation processing unit 43 searches the authority certificate identifier 91 in the OCSP certificate identification table 90 by using the authority certificate identifier acquired at the step 2005 as a key, and specifies the same authority certificate identifier 91 as the acquired authority certificate identifier (2011). The validation processing unit 43 acquires an OCSP certificate file name corresponding to the identified authority certificate identifier 91 (2012). Subsequently, the validation processing unit 43 conducts selection processing of an encryption algorithm to be used in the response signature, and specifies one encryption algorithm (2013). Operation of determination processing of the encryption algorithm to be used in the response signature will be described in detail later with reference to FIG. 14. Here, it is ascertained whether the encryption algorithm to be used in the response signature has been successfully specified by the determination processing of the encryption algorithm (2014). In a case where the encryption algorithm to be used in the response signature has been successfully specified, the validation processing unit 43 uses the OCSP certificate file name acquired at the step 2012 and the encryption algorithm to be used in the response signature algorithm specified at the step 2013, affixes a signature to the validation result by using a key of the OCSP certificate held in the key holding unit 48, and creates a validation response (OCSP response) with a signature affixed thereto (2015).

In a case where the encryption algorithm to be used in the response signature has not been successfully specified, the validation processing unit 43 creates a validation response in which the error result is set to be an error (2016). Subsequently, the validation processing unit 43 transmits result data created at the step 2016 to the terminal device 11 via the communication unit 40c (2017). The terminal device 11 receives a validation response corresponding to the validation request from the OCSP responder 13 (2101), and ascertains whether the validation object certificate is revoked.

Operation of determining an encryption algorithm to be used in a response signature affixed to the validation result conducted by the OCSP responder 13 at the step 2013 will now be described.

Figure 14:
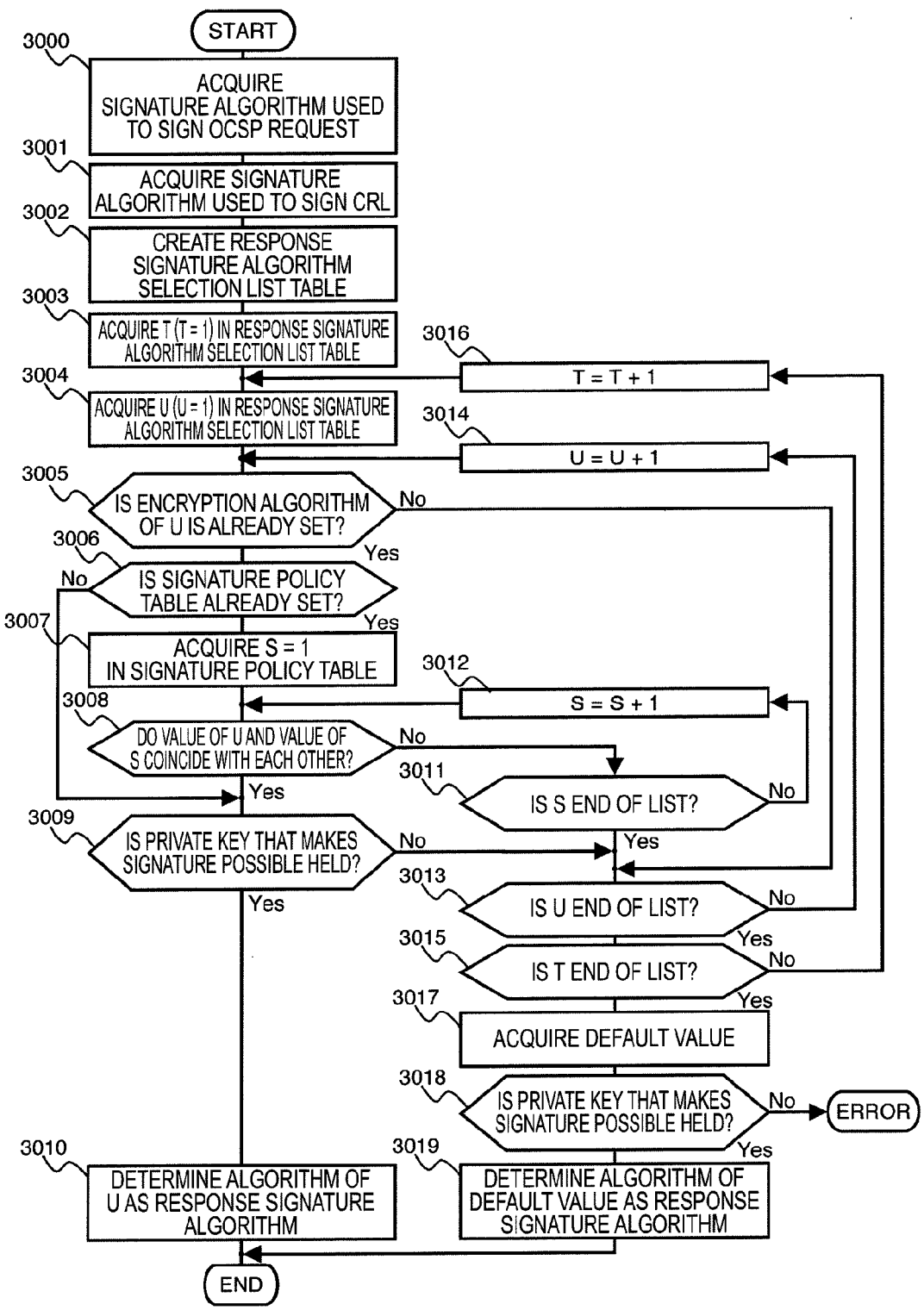
FIG. 14 is a flow chart of determination processing of an encryption algorithm to be used in a response signature, in the OCSP responder.

FIG. 14 is a diagram showing a flow chart of determination processing of an encryption algorithm to be used in a response signature, executed by the OCSP responder 13.

The validation processing unit 43 in the OCSP responder 13 creates the response signature algorithm selection list table 120 every accepted validation request (OCSP request). Specifically, the validation processing unit 43 acquires the PSA 104 and the signature algorithm 105 used to sign OCSP request from the request table 100 by using the request identifier 101 in the accepted validation request as a key (3000). Subsequently, the validation processing unit 43 acquires the signature algorithm 87 used to sign CRL from the revocation information table 80 by using the authority identifier acquired at the step 2006 as a key (3001). And the validation processing unit 43 creates the response signature algorithm selection list table 120 corresponding to the validation request from the information acquired at the step 3000 and the step 3001 and the information of the signature algorithm that OCSP responder sets as a default held in the setting information holding unit 45 and a signature algorithm specified for a version of OCSP (3002). Specifically, the validation processing unit 43 registers information corresponding to contents stated in the item 122 column in the response signature algorithm selection list table 120 into the encryption algorithm 124 column. Here, in a case where there are a plurality of PSAs 104 registered in the column of the request identifier 101 functioning as a key in the request table 100 when acquiring the PSA at the step 3000, all PSAs 104 stated in the request table 100 are acquired in accordance with order in which they are stated and all PSAs 104 are registered in the encryption algorithm 124 column in the response signature algorithm selection table 120. In a case where there are a plurality in the encryption algorithm column 124 for one item 122 at this time, numbers are assigned to the U123 column in order beginning with 1 as priorities. In a case where the encryption algorithm 124 column is specified to one, the U123 column is set equal to 1.

Subsequently, the validation processing unit 43 selects an encryption algorithm to be used in the response signature by using the created response signature algorithm selection table 120 and the signature policy table 110. First, in the T121 column in the response signature algorithm selection table 120, T is set to T=1 (3003). Subsequently, the validation processing unit 43 sets U=1 in the U123 column corresponding to the acquired T in the response signature algorithm selection table 120 (3004). And the validation processing unit 43 ascertains whether a value of the encryption algorithm 124 corresponding to the U is already set (whether the pertinent column in the response signature algorithm selection list table 120 is filled) (3005). In a case where the encryption algorithm 124 is not set, the validation processing unit 43 proceeds to step 3013. In a case where the encryption algorithm 124 is set, the validation processing unit 43 ascertains whether the signature policy table 110 is held in the setting information holding unit 45 (3006). In a case where the signature policy table 110 is held, the validation processing unit 43 sets S=1 in the S111 in the signature policy table 110 (3007). Subsequently, the validation processing unit 43 acquires an encryption algorithm stated in the encryption algorithm 124 column corresponding to the U and an encryption algorithm stated in the response signature algorithm 112 column corresponding to the S, and ascertains whether the encryption algorithms coincide with each other (3008). In a case where the encryption algorithms differ from each other, the validation processing unit 43 proceeds to step 3011. In a case where the encryption algorithms coincide with each other, the validation processing unit 43 ascertains whether a private key that makes signature possible in the encryption algorithm stated in the encryption algorithm 124 column corresponding to the U is held in the key holding unit 48 (3009). In a case where the private key is not held, the validation processing unit proceeds to step 3013. In a case where a private key for the encryption algorithm stated in the encryption algorithm 124 column corresponding to the U is held, the validation processing unit 43 determines the encryption algorithm as an encryption algorithm to be used in the response signature (3010).

In a case where the encryption algorithm stated in the encryption algorithm 124 column corresponding to the U and the encryption algorithm stated in the response signature algorithm 112 column corresponding to the S differ from each other (in a case where the result of 3008 becomes No), the validation processing unit 43 ascertains whether the value of S is an end of the S111 column in the signature policy table 110 (3011). In a case where the value of S is not the end of the S111 column, the validation processing unit 43 increases the value of S by one and proceeds to the step 3008 again (3012).

In a case where the value of S is the end of the S111 column at the step 3011, in a case where there isn't the encryption algorithm 124 set to correspond to the U at the step 3005, or in a case where a private key that makes signature possible in a signature algorithm corresponding to the U is not held at the step 3009, the validation processing unit 43 ascertains whether the value of U is the end of the U123 column in the response signature algorithm selection list table 120 (3013). In a case where the value of U is not the end of the U123 column, the validation processing unit 43 increases the value of U by one and proceeds to the step 3005 again (3014). In a case where the value of U is the end of the U123 column, the validation processing unit 43 proceeds to step 3015. The validation processing unit 43 ascertains whether the value of T is an end of the T121 column in the response signature algorithm selection list table 120 (3015). In a case where the value of T is not the end of the T121 column, the validation processing unit 43 increases the value of T by one and proceeds to the step 3004 again (3016).

In a case where the value of T is the end of the T121 column at the step 3015, the validation processing unit 43 acquires an encryption algorithm of the default that is made indispensable to use in a version of OCSP defined in RFC 6277 in non patent literature (3017). And the validation processing unit 43 ascertains whether a private key that makes signature possible in the encryption algorithm of the default in OCSP ver1 is held in the key holding unit 48 (3018). In a case where the private key is held, the validation processing unit 43 determines the encryption algorithm of the default in OCSP ver1 as the encryption algorithm to be used in the response signature (3019). In a case where the private key of the encryption algorithm of the default corresponding to OCSP ver1 is not held, the OCSP responder 13 becomes an error.

Heretofore, an embodiment of the present invention has been described. According to the present embodiment, it is possible to determine an encryption algorithm of a response signature affixed to a validation result of a validation object certificate that is suitable to a user irrespective of the change situation of the encryption algorithm used for a signature on a certificate.

Furthermore, as another embodiment, an example in which the OCSP certificate identification table 90 shown in FIG. 9 is extended will now be described.

FIG. 15 is a diagram showing a table example in a case where the OCSP certificate identification table 90 is extended.

The OCSP certificate identification table 90 stores a response signature algorithm 94 besides the items 91 to 93 described above. This is obtained by setting the signature policy table 110 described above with reference to FIG. 11 into the OCSP certificate identification table 90. In the response signature algorithm 94 column, encryption algorithms for each of which the OCSP responder 13 holds a private key and that make signature possible are described every certification authority 12. The encryption algorithms are registered in order of descending priority beginning with an encryption algorithm for a response signature set to be default by the OCSP responder 13.

In a case where the OCSP certificate identification table 90 is held as shown in FIG. 15, the signature policy table 110 is managed in the same table as the OCSP certificate identification table 90.

In a case where the OCSP certificate identification table 90 is held as described above, the validation processing unit 43 ascertains whether the response signature algorithm column 94 in the OCSP certificate identification table 90 is already set, at the step 3005 for confirming the signature policy table 110 in the determination processing of an encryption algorithm to be used in a response signature executed by the OCSP responder 13 shown in FIG. 14. In addition, at the step 3006, the validation processing unit 43 regards signature algorithms which are set in the response signature algorithm column 94 as 1, 2 ... in item number S in order from the top, and conducts comparison with the response signature algorithm selection list table 120.

In a case where the OCSP responder 13 copes with a plurality of certificate authorities (takes in CRLs issued by a plurality of certificate authorities 12), it is also possible to set a different signature policy every certification authority 12 as a result of the foregoing description.

Embodiment 2

In the embodiment 1, the case where the U123 column indicates the priority with respect to the encryption algorithm 124 registered in the response signature algorithm selection list table 120 has been described. In the embodiment 1, encryption algorithms are registered in the response signature algorithm selection list table 120 supposing that the priority descends in order in which the U123 column is stated. For example, however, the statement order in PreferredSignatureAlgorithm in the validation request is not necessarily be the priority intended by the user.

In the present embodiment, therefore, a method of determining an encryption algorithm to be used in the response signature by using a priority previously specified by the OCSP responder in the signature policy table 110 held by the OCSP responder 13 even in a case where the user is not conscious of priority and there are a plurality of encryption algorithms corresponding to T121.

Figure 16:
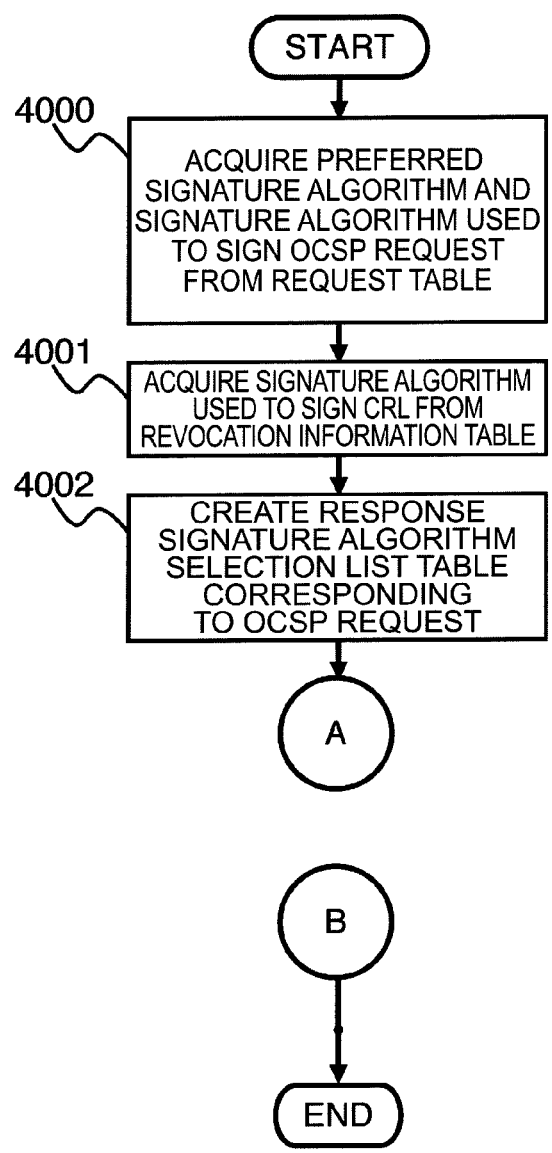
FIG. 16 is a flow chart of determination processing of an encryption algorithm to be used in a response signature, in the OCSP responder in a second embodiment.
Figure 17:
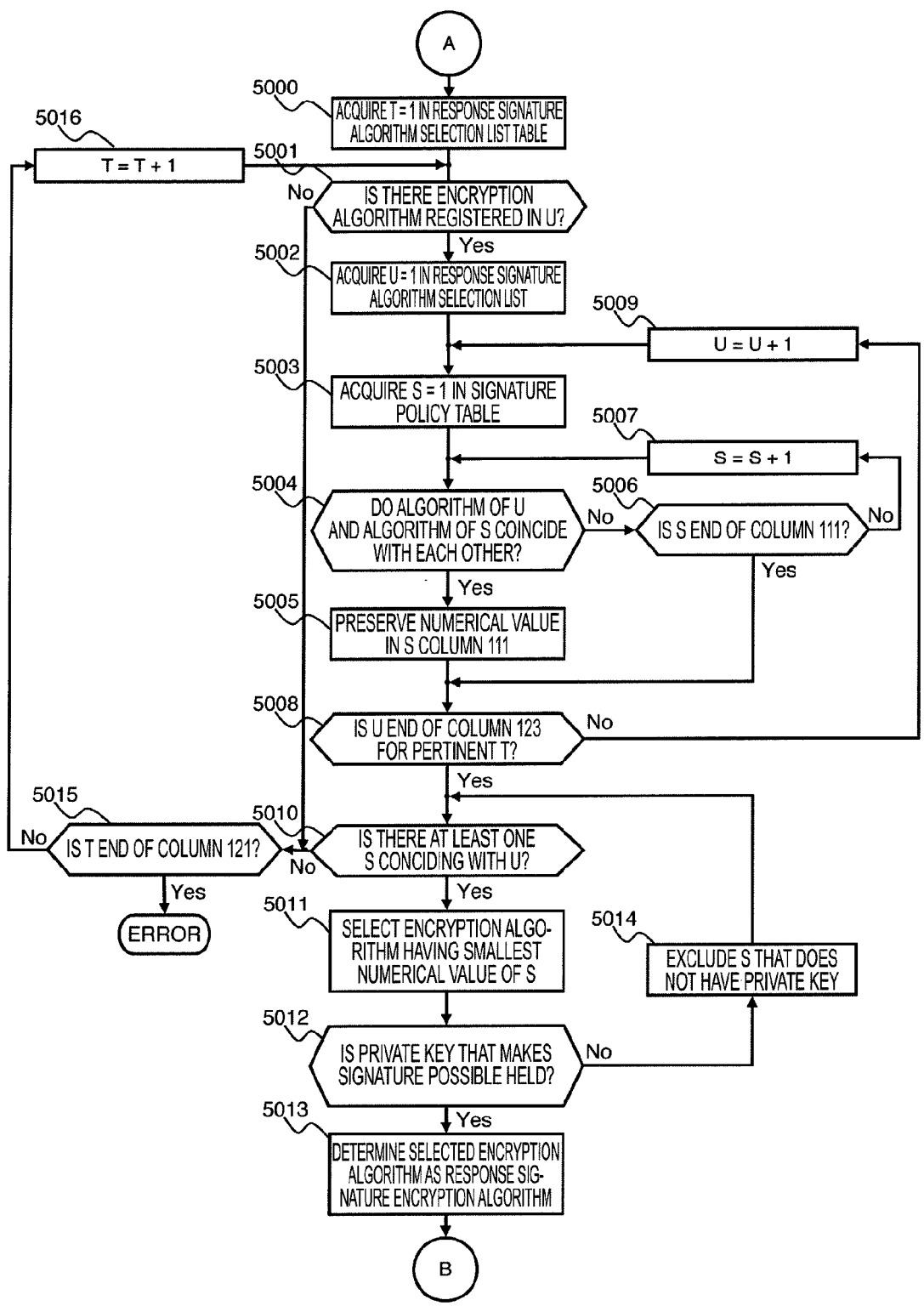
FIG. 17 is a flow chart of determination processing of an encryption algorithm to be used in a response signature, in the OCSP responder in a case where a plurality of encryption algorithms are previously set in a first item in the response signature algorithm selection list table, in the second embodiment.

FIGS. 16 and 17 are diagrams showing a flow chart of determination processing of an encryption algorithm to be used in the response signature, executed by the OCSP responder 13.

With reference to FIG. 16, the validation processing unit 43 in the OCSP responder 13 creates the response signature algorithm selection list table 120 every accepted validation request. In order to create the response signature algorithm selection list table 120, first, the validation processing unit 43 acquires the PSA 104 and the signature algorithm 105 used to sign OCSP request from the request table 100 by using the request identifier 101 in the accepted validation request as a key (4000). Subsequently, the validation processing unit 43 acquires the signature algorithm 87 used to sign CRL from the revocation information table 80 by using the authority identifier acquired at the step 2006 as a key (4001). And the validation processing unit 43 creates the response signature algorithm selection list table 120 corresponding to the validation request from the information acquired at the step 4000 and the step 4001 and the information of the signature algorithm that OCSP responder sets as a default held in the setting information holding unit 45 and the signature algorithm specified for a version of OCSP (4002). Specifically, the validation processing unit 43 registers the information acquired at the step 4000 and the step 4001 into the encryption algorithm 124 column in the response signature algorithm selection list table 120 in association with contents stated in the item 122 column.

Here, in a case where there is information of a plurality of associated encryption algorithms, the plurality of encryption algorithms are registered in rows in the encryption algorithm 124 column.

For example, in a case where there are a plurality of PSAs 104 registered in the column of the request identifier 101 functioning as a key in the request table 100 when acquiring the PSA at the step 4000, all PSAs 104 stated in the request table 100 are acquired and all PSAs are registered into the encryption algorithm 124 column in the response signature algorithm selection table 120. In a case where there are a plurality of encryption algorithms in the encryption algorithm 124 column for one item 122, numbers are assigned to the U123 column in order from 1 for convenience. In a case where one encryption algorithm is specified in the encryption algorithm 124 column, 1 is set in the U123 column.

Subsequently, the validation processing unit 43 proceeds to step 5000 in A in FIG. 17.

FIG. 17 is a diagram showing processing of selecting an encryption algorithm to be used in the response signature, by using the response signature algorithm selection list table 120 created in FIG. 16 and the signature policy table 110.

First, in the T121 column in the response signature algorithm selection list table 120, an item of T=1 is acquired (5000). The validation processing unit 43 ascertains in the U123 column in the response signature algorithm selection list table 120 whether there is an encryption algorithm registered in the encryption algorithm 124 column corresponding to the acquired T (5001). In a case where there isn't an encryption algorithm registered in the pertinent 124 column, the validation processing unit 43 proceeds to step 5015. In a case where there is an encryption algorithm registered in the pertinent 124 column, the validation processing unit 43 acquires an item of U=1 (5002).

Subsequently, the validation processing unit 43 acquires an item of S=1 in the S111 column in the signature policy table 110 held in the setting information holding unit 45 (5003). And the validation processing unit 43 ascertains whether an encryption algorithm stated in the encryption algorithm 124 column in the response signature algorithm selection list table 120 corresponding to the acquired U is the same as an encryption algorithm stated in the response signature algorithm 112 column in the signature policy table 110 corresponding to the acquired S (5004). In a case where the encryption algorithms coincide with each other, the validation processing unit 43 preserves a numerical value in the S column in the signature policy table 110 that is acquired at the present time (5005). In a case where the encryption algorithms do not coincide with each other at the step 5004, the validation processing unit 43 ascertains whether the value of the item number S that is acquired at the present time is an end in the S111 column in the signature policy table 110 (5008). In a case where the acquired item number S is not the end in the S111 column, the validation processing unit 43 increases the numerical value of S by one and proceeds to the step 5004 again (5007). In a case where the acquired item number S is the end in the S111 column, the validation processing unit 43 proceeds to step 5008.

In the case where the numerical value in the item number S is preserved at the step 5005, and in a case where the value of S acquired at the step 5006 is the end of the S111 column, the validation processing unit 43 ascertains whether the value of the item number U acquired at the present time is an end of the U123 column among a plurality of U values existing for the pertinent T121 in the response signature algorithm selection list table 120 (5008). In a case where the acquired value of the item number U is not the end of the U123 column for the pertinent T121 column, the validation processing unit 43 increases the numerical value of U by one and proceeds to the step 5003 again (5009). Here, in a case where the value in the column U is the end of the U123 column, the validation processing unit 43 proceeds to step 5010.

Subsequently, the validation processing unit 43 ascertains whether there is at least one encryption algorithm found to be coincident between the item number U and the item number S at the step 5004 (5010). In a case where there is nothing at all, the validation processing unit 43 proceeds to step 5015. In a case where there is at least one coincident encryption algorithm, the validation processing unit 43 compares numerical values of the item number S preserved at the step 5005 with each other, and selects an encryption algorithm having the smallest numerical value of S (in other words, an encryption algorithm registered in a higher order in the signature policy table 110) (5011).

And the validation processing unit 43 ascertains whether a private key that makes signature possible in the selected encryption algorithm is held in the key holding unit 48 (5012). In a case where a private key for the selected encryption algorithm is held, the validation processing unit 43 determines the encryption algorithm as the encryption algorithm to be used in the response signature, proceeds to B in FIG. 16 (5013). In a case where the private key is not held at the step 5012, the validation processing unit 43 excludes the numerical value of the item number S pertinent to the encryption algorithm selected at the step 5011, and proceeds to the step 5010 again (5014).

In a case where an encryption algorithm is not registered in the pertinent 124 column at the step 5001, or in a case where there is no encryption algorithm found to be coincident between the item number U and the item number S at the step 5010, the validation processing unit 43 ascertains whether the acquired value of T is an end of the T121 column in the response signature algorithm selection list table 120 (5015). In a case where the value of T is not the end of the T121 column, the validation processing unit 43 increases the value of T by one and proceeds to step 5001 again (5016). In a case where the acquired value of T is the end of the T121 column in the response signature algorithm selection list table 120 at the step 5015, the OCSP responder 13 returns an error.

Heretofore, the second embodiment of the present invention has been described. Even in a case where a plurality of encryption algorithms 124 are set without priority in one item 122 in the response signature algorithm selection list table 120, it is possible according to the present embodiment to determine an encryption algorithm for a response signature to be affixed to a validation result of a validation object certificate that is suitable to the user, on the basis of the signature policy of the OCSP responder.

The foregoing description has been made with respect to the embodiments. However, it is apparent to those skilled in the art that the present invention is not restricted to the embodiments, but various changes and modifications can be made without departing from the spirit of the present invention and the scope of appended claims.

REFERENCE SIGNS LIST

11 Terminal device
12 Certification authority
13 OCSP responder
14 Network
20*a* Processing unit
20*b* Storage unit
20*c* Input/output unit
20*d* Communication unit
21 Signed document creation unit
22 Signature verification/certificate validation unit
23 Control unit
24 Electronic document holding unit
25 Key holding unit
26 Verification/validation object holding unit
30*a* Processing unit
30*b* Storage unit
30*c* Input/output unit
30*d* Communication unit
31 Issuance unit
32 Management unit
33 Control unit
34 Certificate DB
35 Subscriber list holding unit
36 CRL repository
40*a* Processing unit
40*b* Storage unit
40*c* Input/output unit
40*d* Communication unit
41 Management unit
42 Revocation information management unit
43 Validation processing unit
44 Control unit
45 Setting information holding unit
46 Revocation information holding unit
47 OCSP certificate holding unit
48 Key holding unit
50 Internal communication line
51 CPU
52 Memory
53 External storage device
54 Communication device
55 Input device
56 Output device
57 Reading device
58 Portable storage media

The invention claimed is:

1. A determination method of an encryption algorithm to be used in a response signature affixed to a validation result of a public key certificate, in a validation server for validating validity of a public key certificate issued by a certification authority, the validation server comprising:
a first storage unit for storing revocation information, the revocation information including information identifying a revoked public key certificate and information identifying a certification authority that issued the revoked public key certificate; and
a second storage unit for storing information of the encryption algorithms that can be coped with by the validation server, the encryption algorithm determination method comprising:
causing the validation server to receive a validation request from a terminal device, the validation request including information identifying the public key certificate, information identifying the certification authority, and information of the encryption algorithm;
causing the validation server to create a validation result that the public key certificate corresponding to the information identifying the public key certificate included in the validation request is valid, in a case where the received information of the public key certificate and information of the certification authority are not present in the first storage unit;
causing the validation server to create a selection list of encryption algorithms that can be used for a response signature affixed to the validation result of the public key certificate in association with information indicating priorities thereof according to an order set to the validation request, by using the information of the encryption algorithm included in the validation request and information of an encryption algorithm used in a signature of the certification authority affixed to the revocation information; and
causing the validation server to compare the encryption algorithms in the second storage unit with the encryption algorithms in the selection list to determine an encryption algorithm that is coincident and high in priority as an encryption algorithm to be used in a signature affixed to the validation result of the public key certificate.

2. The encryption algorithm determination method according to claim 1, comprising:
causing the validation server to affix a signature to the validation result by using the determined encryption algorithm and a private key that makes signature possible in the encryption algorithm, and transmit the resultant validation result to the terminal device.

3. A determination method of an encryption algorithm to be used in a response signature affixed to a validation result of a public key certificate, in a validation server for validating validity of a public key certificate issued by a certification authority,
the validation server comprising:
a first storage unit for storing revocation information, the revocation information including information identifying a revoked public key certificate and information identifying a certification authority that issued the revoked public key certificate; and
a second storage unit for storing information of the encryption algorithms that can be coped with by the validation server in association with information indicating priorities thereof specified by the validation server in advance,
the encryption algorithm determination method comprising:
causing the validation server to receive a validation request from a terminal device, the validation request including information identifying the public key certificate, information identifying the certification authority, and information of the encryption algorithm;
causing the validation server to create a validation result that the public key certificate corresponding to the information identifying the public key certificate included in the validation request is valid, in a case where the received information of the public key certificate and information of the certification authority are not present in the first storage unit;
causing the validation server to create a selection list of encryption algorithms that can be used for a response signature affixed to the validation result of the public key certificate, by using the information of the encryption algorithm included in the validation request and information of an encryption algorithm used in a signature of the certification authority affixed to the revocation information; and
causing the validation server to compare the encryption algorithms in the second storage unit with the encryption algorithms in the selection list to determine an encryption algorithm that is coincident and high in priority as as an encryption algorithm to be used in a signature affixed to the validation result of the public key certificate.

4. The encryption algorithm determination method according to claim 1, wherein the validation server is an OCSP (Online Certificate Status Protocol) responder.

5. The encryption algorithm determination method according to claim 4, wherein the selection list comprises information of the encryption algorithm included in the validation request, information of an encryption algorithm used in a signature of the certification authority affixed to the revocation information, and information of an encryption algorithm of an OCSP default stipulated in RFC2560.

6. The encryption algorithm determination method according to claim 5, comprising:
causing the validation server to acquire an OCSP certificate, which is a public key certificate of the OCSP responder, from the certification authority; and
causing the validation server to affix a signature to a validation result by using the determined encryption algorithm and a private key corresponding to a public key of the OCSP certificate, and transmit the resultant validation result to the terminal device.

7. A validation server for validating validity of a public key certificate issued by a certification authority, the validation server comprising:
a first storage device which stores revocation information, the revocation information including information identifying a revoked public key certificate and information identifying a certification authority that issued the revoked public key certificate;
a second storage device which stores information of the encryption algorithms that can be coped with by the validation server; and
a processing device which:
receives a validation request from a terminal device, the validation request including information identifying the public key certificate, information identifying the certification authority, and information of the encryption algorithm,
creates a validation result that the public key certificate corresponding to the information identifying the public key certificate included in the validation request is valid, in a case where the received information of the public key certificate and information of the certification authority are not present in the first storage device,
creates a selection list of encryption algorithms that can be used for a response signature affixed to the validation result of the public key certificate in association with information indicating priorities thereof according to an order set to the validation request, by using the information of the encryption algorithm included in the validation request and information of an encryption algorithm used in a signature of the certification authority affixed to the revocation information,
compares the encryption algorithms in the second storage unit with the encryption algorithms in the selection list to determine an encryption algorithm that is coincident and high in priority as an encryption algorithm to be used in a signature affixed to the validation result of the public key certificate, on the basis of the information in the second storage device and the created selection list, and
affixes a signature to the validation result by using the determined encryption algorithm and a private key that makes signature possible in the encryption algorithm, and transmits the resultant validation result to the terminal device.

8. A validation server for validating validity of a public key certificate issued by a certification authority, the validation server comprising:
   a first storage device which stores revocation information, the revocation information including information identifying a revoked public key certificate and information identifying a certification authority that issued the revoked public key certificate;
   a second storage device which stores information of the encryption algorithms that can be coped with by the validation server in association with information indicating priorities thereof specified by the validation server in advance; and
   a processing device which:
   receives a validation request from a terminal device, the validation request including information identifying the public key certificate, information identifying the certification authority, and information of the encryption algorithm,
   creates a validation result that the public key certificate corresponding to the information identifying the public key certificate included in the validation request is valid, in a case where the received information of the public key certificate and information of the certification authority are not present in the first storage device,
   creates a selection list of encryption algorithms that can be used for a response signature affixed to the validation result of the public key certificate, by using the information of the encryption algorithm included in the validation request and information of an encryption algorithm used in a signature of the certification authority affixed to the revocation information,
   compares the encryption algorithms in the second storage unit with the encryption algorithms in the selection list to determine an encryption algorithm that is coincident and high in priority as an encryption algorithm to be used in a signature affixed to the validation result of the public key certificate, on the basis of the information in the second storage device and the created selection list, and
   affixes a signature to the validation result by using the determined encryption algorithm and a private key that makes signature possible in the encryption algorithm, and transmits the resultant validation result to the terminal device.

9. The validation server according to claim 7, wherein the validation server is an OCSP (Online Certificate Status Protocol) responder.

10. The validation server according to claim 9, wherein the selection list comprises information of the encryption algorithm included in the validation request, information of an encryption algorithm used in a signature of the certification authority affixed to the revocation information, and information of an encryption algorithm of an OCSP default stipulated in RFC2560.

11. The validation server according to claim 10, wherein
   the processing unit acquires an OCSP certificate, which is a public key certificate of the OCSP responder, from the certification authority, and
   the processing device affixes a signature to a validation result by using the determined encryption algorithm and a private key corresponding to a public key of the OCSP certificate, and transmits the resultant validation result to the terminal device.

12. The validation server according to claim 8, wherein the validation server is an OCSP (Online Certificate Status Protocol) responder.

13. The validation server according to claim 12, wherein the selection list comprises information of the encryption algorithm included in the validation request, information of an encryption algorithm used in a signature of the certification authority affixed to the revocation information, and information of an encryption algorithm of an OCSP default stipulated in RFC2560.

14. The validation server according to claim 13, wherein
   the processing unit acquires an OCSP certificate, which is a public key certificate of the OCSP responder, from the certification authority, and
   the processing device affixes a signature to a validation result by using the determined encryption algorithm and a private key corresponding to a public key of the OCSP certificate, and transmits the resultant validation result to the terminal device.

* * * * *